(12) United States Patent
Lippett et al.

(10) Patent No.: US 9,830,241 B2
(45) Date of Patent: Nov. 28, 2017

(54) DEBUG IN A MULTICORE ARCHITECTURE

(71) Applicant: Synopsys, Inc., Mountain View, CA (US)

(72) Inventors: Mark David Lippett, Watlington (GB); Ayewin Oung, Maidenhead (GB)

(73) Assignees: Synopsys, Inc., Mountain View, CA (US); Fujitsu Semiconductor Limited, Kanagawa (JP)

( * ) Notice: Subject to any disclaimer, the term of this patent is extended or adjusted under 35 U.S.C. 154(b) by 154 days.

(21) Appl. No.: 14/822,667

(22) Filed: Aug. 10, 2015

(65) Prior Publication Data
US 2015/0347255 A1    Dec. 3, 2015

Related U.S. Application Data

(63) Continuation of application No. 13/965,116, filed on Aug. 12, 2013, now Pat. No. 9,129,050, which is a
(Continued)

(51) Int. Cl.
*G06F 9/46* (2006.01)
*G06F 11/263* (2006.01)
(Continued)

(52) U.S. Cl.
CPC ........ *G06F 11/263* (2013.01); *G06F 11/0724* (2013.01); *G06F 11/2242* (2013.01);
(Continued)

(58) Field of Classification Search
CPC ............. G06F 11/0724; G06F 11/2242; G06F 11/263; G06F 11/3409; G06F 11/3466; G06F 11/348; G06F 11/3636
(Continued)

(56) References Cited

U.S. PATENT DOCUMENTS

| 4,001,783 A | 1/1977 | Monahan et al. |
| 4,414,624 A | 11/1983 | Summer, Jr. et al. |

(Continued)

FOREIGN PATENT DOCUMENTS

| CN | 1402132 A | 3/2003 |
| EP | 1089183 A | 4/2001 |

(Continued)

OTHER PUBLICATIONS

Tang, Shan, and Qiang Xu. "A multi-core debug platform for NoC-based systems." Design, Automation & Test in Europe Conference & Exhibition, 2007. Date'07. IEEE, 2007. pp. 1-6.*
(Continued)

*Primary Examiner* — Meng An
*Assistant Examiner* — Willy W Huaracha
(74) *Attorney, Agent, or Firm* — Fenwick & West LLP

(57) ABSTRACT

A method of monitoring thread execution within a multicore processor architecture which comprises a plurality of interconnected processor elements for processing the threads, the method comprising receiving a plurality of thread parameter indicators of one or more parameters relating to the function and/or identity and/or execution location of a thread or threads, comparing at least one of the thread parameter indicators with a first plurality of predefined criteria each representative of an indicator of interest, and generating an output consequential upon thread parameter indicators which have been identified to be of interest as a result of the said comparison.

20 Claims, 22 Drawing Sheets

Related U.S. Application Data continuation of application No. 10/941,457, filed on Sep. 14, 2004, now Pat. No. 9,038,070.

(51) Int. Cl.
| | | |
|---|---|---|
| G06F 11/34 | (2006.01) | |
| G06F 11/22 | (2006.01) | |
| G06F 11/36 | (2006.01) | |
| G06F 11/07 | (2006.01) | |

(52) U.S. Cl.
CPC ........ *G06F 11/348* (2013.01); *G06F 11/3409* (2013.01); *G06F 11/3466* (2013.01); *G06F 11/3636* (2013.01)

(58) Field of Classification Search
USPC ........................................................ 718/100
See application file for complete search history.

(56) References Cited

U.S. PATENT DOCUMENTS

| | | | |
|---|---|---|---|
| 5,202,987 A | 4/1993 | Bayer et al. | |
| 5,504,670 A | 4/1996 | Barth et al. | |
| 5,592,671 A | 1/1997 | Hirayama | |
| 5,828,880 A | 10/1998 | Hanko | |
| 5,987,601 A | 11/1999 | Donovan | |
| 6,029,223 A | 2/2000 | Klein | |
| 6,094,729 A * | 7/2000 | Mann | G06F 11/348 714/25 |
| 6,314,501 B1 | 11/2001 | Gulick et al. | |
| 6,489,974 B1 | 12/2002 | Johnson et al. | |
| 6,496,880 B1 | 12/2002 | Ma et al. | |
| 6,587,967 B1 | 7/2003 | Bates et al. | |
| 6,593,940 B1 | 7/2003 | Petersen et al. | |
| 6,598,012 B1 | 7/2003 | Berry et al. | |
| 6,903,556 B2 | 6/2005 | Sutton | |
| 7,000,092 B2 | 2/2006 | Gehman et al. | |
| 7,047,371 B2 | 5/2006 | Dortu | |
| 7,047,521 B2 | 5/2006 | Bunnell | |
| 7,076,494 B1 | 7/2006 | Baer et al. | |
| 7,146,529 B2 | 12/2006 | Aguilar et al. | |
| 7,178,145 B2 * | 2/2007 | Bono | G06F 9/4881 718/100 |
| 7,401,333 B2 | 7/2008 | Vandeweerd | |
| 8,533,716 B2 | 9/2013 | Lippett | |
| 8,732,439 B2 | 5/2014 | Lippett | |
| 2003/0005380 A1 | 1/2003 | Nguyen et al. | |
| 2003/0005417 A1* | 1/2003 | Gard | G06F 11/3656 717/135 |
| 2003/0014736 A1* | 1/2003 | Nguyen | G06F 11/362 717/129 |
| 2003/0097613 A1 | 5/2003 | Kageshima | |
| 2004/0006729 A1 | 1/2004 | Pendurkar | |
| 2004/0128663 A1 | 7/2004 | Rotem | |
| 2004/0139250 A1* | 7/2004 | Homewood | G06F 13/385 710/52 |
| 2005/0154860 A1* | 7/2005 | Arimilli | G06F 11/3466 712/216 |
| 2005/0183069 A1 | 8/2005 | Cepulis | |
| 2005/0203988 A1 | 9/2005 | Nollet et al. | |
| 2005/0223359 A1* | 10/2005 | Rao Nagaraju | G06F 11/362 171/124 |
| 2006/0037017 A1 | 2/2006 | Accapadi et al. | |
| 2006/0259824 A1* | 11/2006 | Sohm | G06F 11/323 714/38.13 |

FOREIGN PATENT DOCUMENTS

| | | |
|---|---|---|
| JP | 04-211842 A | 8/1992 |
| JP | 2001-154876 A | 6/2001 |
| JP | 2003-131902 A | 5/2003 |
| JP | 2004-021751 A | 1/2004 |
| TW | 544629 B | 11/2003 |
| TW | 559729 B | 11/2003 |
| WO | WO 00/73809 A1 | 7/2000 |
| WO | WO 02/46887 A2 | 6/2002 |
| WO | WO 2004/019206 A1 | 3/2004 |

OTHER PUBLICATIONS

Mitchell, Earl. "Multi-core and Multi-threaded SoCs Present New Debugging Challenges." Datasheet MIPS Technologies (2003): 1-6.*
Maier, Klaus D. "On-chip debug support for embedded systems-on-chip." Circuits and Systems, 2003. ISCAS'03. Proceedings of the 2003 International Symposium on. vol. 5. IEEE, 2003. pp. 1-4.*
Indian First Office Action, Indian Application No. 1496/CHENP/2007, Aug. 6, 2013, 4 pages.
Beynon, M. D. et al., "Low-Cost Non-Intrusive Debugging Strategies for Distributed Parallel Programs," 2002 IEEE International Conference on Cluster Computing, Sep. 23-26, 2002, pp. 439-442.
Chinese First Office Action, Chinese Application No. 200580030789.4, dated Jul. 4, 2008, 11 pages.
Chinese Second Office Action, Chinese Application No. 200580030789.4, dated Apr. 10, 2009, 7 pages.
Chinese Third Office Action, Chinese Application No. 200580030789.4, dated Jul. 30, 2010, 1 page.
Chinese Fourth Office Action, Chinese Application No. 200580030789.4, dated Feb. 10, 2011, 6 pages.
European Examination Report, European Application No. 05779159.2, dated Aug. 29, 2007, 5 pages.
European Examination Report, European Application No. 05779159.2, dated Jan. 18, 2011, 6 pages.
European Result of Consultation, European Application No. 05779159.2, Jul. 29, 2011, 5 pages.
Japanese Office Action, Japanese Application No. 2007-530774, dated Aug. 2, 2011, 19 pages.
Japanese Office Action, Japanese Application No. 2007-530774, dated Jul. 31, 2012, 9 pages.
Korean Office Action, Korean Application No. 10-2007-7006808, dated Feb. 16, 2012, 5 pages.
Korean Notice of Allowance, Korean Application No. 10-2007-7006808, dated Dec. 28, 2012, 3 pages.
Korean Office Action, Korean Application No. 10-20127021494, dated Dec. 14, 2012, 7 pages.
Mitchell, E., "Multi-Core and Multi-Threaded SoCs Present New Debugging Challenges," Datasheet MIPS Technologies, Aug. 2003, pp. 1-6.
PCT International Search Report, PCT Application No. PCT/GB2005/003525, dated Nov. 14, 2006, 5 pages.
PCT Written Opinion, PCT Application No. PCT/GB2005/003525, dated Nov. 14, 2006, 6 pages.
PCT International Preliminary Report on Patentability, PCT Application No. PCT/GB2005/003525, dated Mar. 20, 2007, 7 pages.
Rosenberg, J.B., "How Debuggers Work? Chapter 9: "Multithreaded debugging,"" John Wiley & Sons, 1996, 14 pages.
Taiwan Office Action, Taiwan Application No. 094131673, dated Sep. 19, 2012, 3 pages.
Japanese Office Action, Japanese Application No. 530774-2007, dated Apr. 16, 2013, 10 pages.
Arison, D. et al., "System Applications of a New 32-Bit Floating-Point DSP Processor," IEEE 1988, 8 pages.
Ignios White Paper, "Unlocking the potential of software-programmable multi-core chips," Apr. 2003, pp. 1-5, Ignios Ltd.
Mooney, V.J. III, "A Hardware-Software Real-Time Operating System Framework for SoCs," IEEE Design & Test of Computers, Nov.-Dec. 2002, pp. 44-51.
Cesario, W. et al., "Component-Based Design Approach for Multicore SoCs," Jun. 10-14, 2002, ACM, DAC 2002, 6 pages.
United States Office Action, U.S. Appl. No. 10/941,457, dated Sep. 3, 2008, 14 pages.
United States Office Action, U.S. Appl. No. 10/941,457, dated Apr. 14, 2009, 13 pages.
United States Office Action, U.S. Appl. No. 10/941,457, dated Sep. 28, 2009, 16 pages.

(56) References Cited

OTHER PUBLICATIONS

United States Office Action, U.S. Appl. No. 10/941,457, dated Apr. 12, 2010, 18 pages.
United States Office Action, U.S. Appl. No. 10/941,457, dated Feb. 13, 2013, 18 pages.
United States Office Action, U.S. Appl. No. 10/941,457, dated Sep. 23, 2013, 14 pages.
United States Office Action, U.S. Appl. No. 10/941,457, dated Feb. 13, 2014, 14 pages.
Chinese First Office Action, Chinese Application No. 201210004184.X, dated Nov. 28, 2013, 10 pages.
Chinese First Office Action, Chinese Application No. 201210004215.1, dated Jan. 13, 2014, 9 pages.
Indian Office Action, Indian Application No. 1496/CHENP/2007, dated Jan. 27, 2014, 1 page.
Chinese Second Office Action, Chinese Application No. 201210004184.X, dated Jul. 23, 2014, 15 pages.
Chinese Second Office Action, Chinese Application No. 201210004215.1, dated Jul. 23, 2014, 13 pages.
United States Office Action, U.S. Appl. No. 13/965,120, dated Aug. 15, 2014, 10 pages.
United States Office Action, U.S. Appl. No. 13/965,116, dated Jul. 31, 2014, 10 pages.
European Third Examination Report, European Application No. 05779159.2, Aug. 13, 2015, 5 pages.

\* cited by examiner

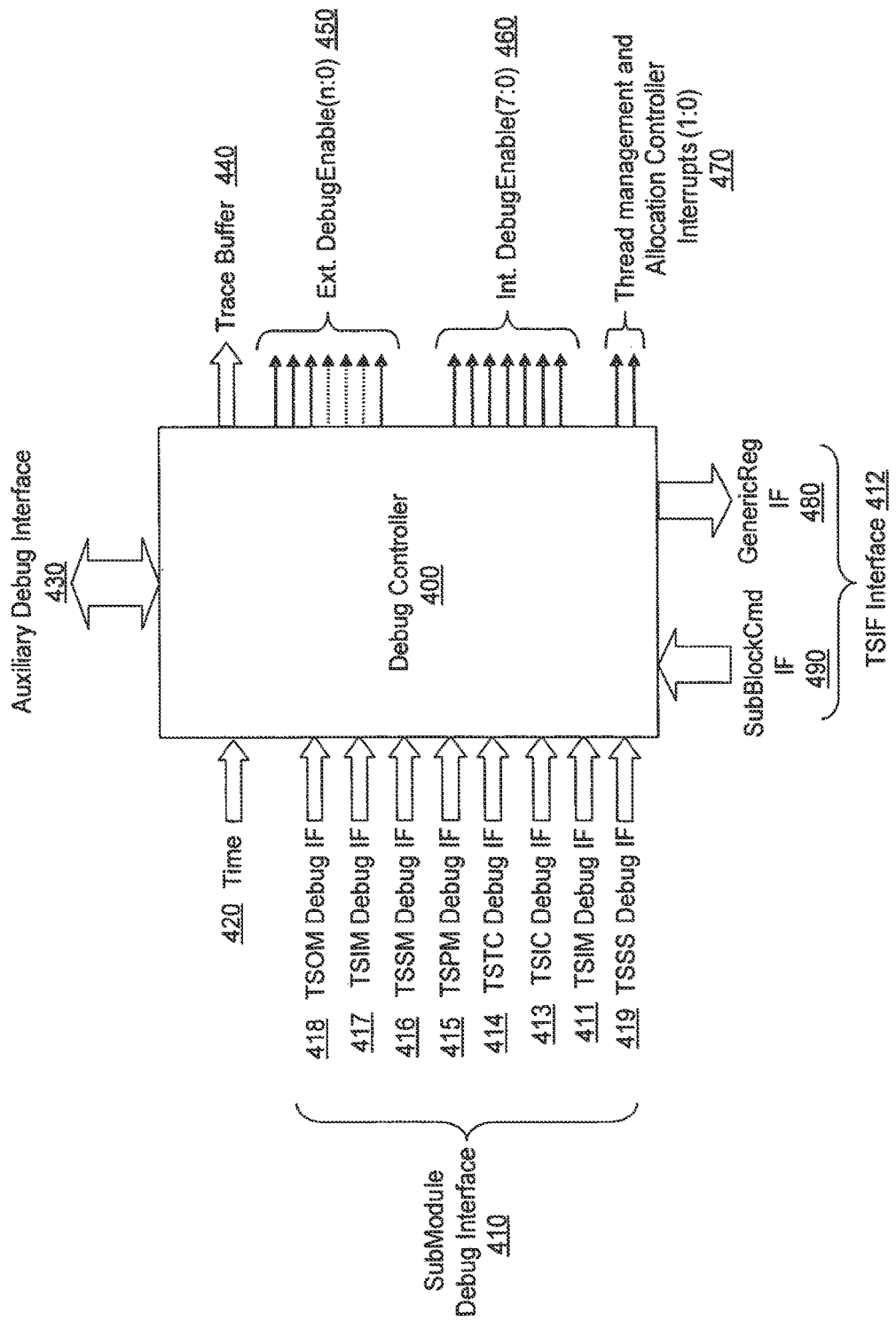

DEBUG IN A MULTICORE ARCHITECTURE

CROSS REFERENCE TO RELATED APPLICATIONS

This application is a continuation of U.S. application Ser. No. 13/965,116, filed Aug. 12, 2013, now U.S. Pat. No. 9,129,050 B2, which is a continuation of U.S. patent application Ser. No. 10/941,457, filed Sep. 14, 2004, now U.S. Pat. No. 9,038,070 B2, which are incorporated herein by reference in their entirety.

BACKGROUND OF THE INVENTION

Field of the Invention

This invention relates to a method and apparatus for debug in a multicore architecture.

Description of the Related Art

In recent years, there has been a trend towards producing processors containing multiple cores, in order to maximise silicon efficiency (i.e. "application-available" $MIPs/mm^2$ or MIPs/mW). Such multicore architectures are ideally suited to running applications based on threads, because a thread defines an autonomous package of work containing an execution state, instruction stream and dataset, which, by definition, may execute concurrently with other threads. However, this concurrency of execution introduces additional problems into the software debug process used on these multicore architectures. Software debug is the general term for locating and correcting errors in the execution of a computer application.

One of the key problems faced in software debug is the Heisenberg bug (also known as the "probe effect"). Any code which is added for the purpose of debug, for example to increase the level of system diagnostics, is likely to subtly change the timing of concurrent and/or parallel executing threads. This brings with it the risk of masking bugs that would otherwise be observed in the production release of the same application. It is also difficult to extract meaningful performance measurements and instrumentation when extensive debug code is present in the build. This is because second order effects like cache and bus performance may be affected by the additional code, as well as it having the more obvious impact on code size.

Additionally, there is an increasing demand for improving the reusability of the software produced for such multicore architectures, due to the extensive resources used in its production. In the past, applications for multicore architectures have been written on a bespoke basis, thus producing hardware specific applications with little portability. In extension, the debug of these applications has also been very specialised.

SUMMARY OF INVENTION

According to a first aspect of the present invention, there is provided a method of monitoring thread execution within a multicore processor architecture which comprises a plurality of interconnected processor elements for processing the threads, the method comprising receiving a plurality of thread parameter indicators indicative of one or more parameters relating to the function and/or identity of a thread or threads comparing at least some of the thread parameter indicators with a first plurality of predefined criteria each representative of an indicator of interest and generating an output consequential upon thread parameter indicators which have been identified to be of interest as a result of the said comparison.

This provides the ability to debug and trace an application, running on a multicore processor architecture, at the thread level, without the requirement of adding code specifically for the purpose of thread level debug. Additionally, this also provides the advantage of enabling the debug of a multicore architecture application, without the introduction of additional code and, therefore, probe effect.

According to a further aspect of the invention, there is provided a thread level software debug controller for a multicore processor architecture having a plurality of interconnected processor elements, each element providing resources for processing threads, the debug controller being in communication with each of the said processor elements and comprising monitor logic for monitoring the allocation and execution of threads within the multicore processor architecture.

BRIEF DESCRIPTION OF THE DRAWINGS

The present invention may be put into practise in a number of ways, and some embodiments will now be described by way of example only and with reference to the accompanying drawings.

FIG. 11 shows a more detailed view of external connections to the thread debug controller of FIG. 10.

DETAILED DESCRIPTION OF THE SPECIFIC EMBODIMENT

Figure 1:
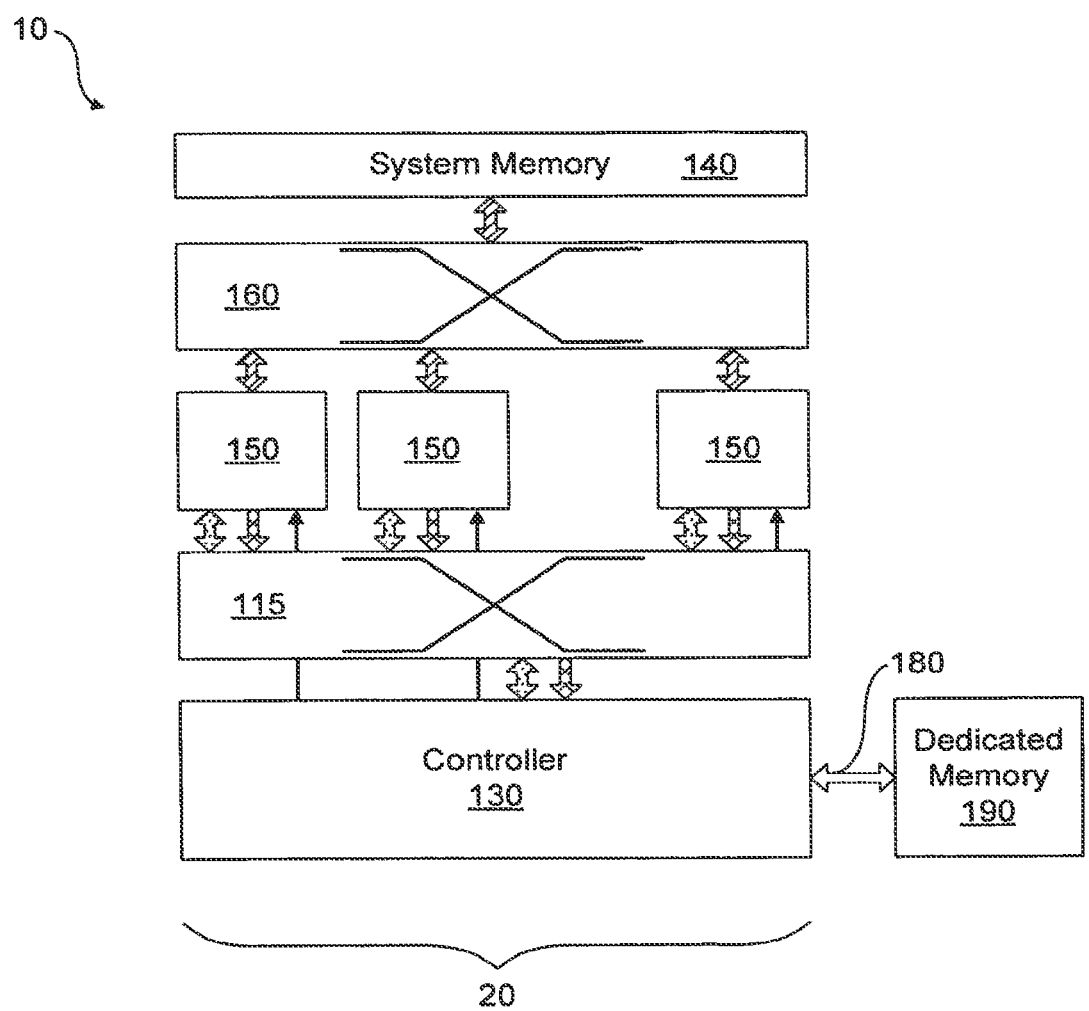
FIG. 1 shows a schematic block diagram of the logical layout of a typical multicore processor architecture system.

FIG. 1 shows a logical view of a system framework of an example of a typical multicore processor architecture. The framework comprises a plurality of processing resources 150, each of which may be similar or dissimilar to the other processing resources 150 in the multicore architecture. A processing resource 150 may be any form of hardware capable of executing an instruction, or its equivalent, therefore can include general purpose processing resources 150, or processing resources 150 with an effectively limited instruction set, for example an Input Output device.

The system frame work also comprises a centralised thread management and allocation system, which includes a thread management and allocation controller 130 and a dedicated tightly coupled memory 190, connected to the thread management and allocation controller ("controller" hereinafter) via memory interface 180. Each processing resource 150 is able to access the controller 130 via an interconnect 115. It is to be understood that no particular interconnection strategy (that is, the arrangement by which the controller 130 communicates with each processing resource 150 and vice versa, and the arrangement by which each processing resource 150 communicates with the system resources, for example memory 140) is required in the implementation of the arrangement of FIG. 1; in particular, point to point links, a central system bus or even a pipelined architecture may equally be employed, save only that each of the processing resources 150 should be able to communicate directly or indirectly (i.e. via other processing resources 150 or otherwise) with the controller 130.

Figure 2:
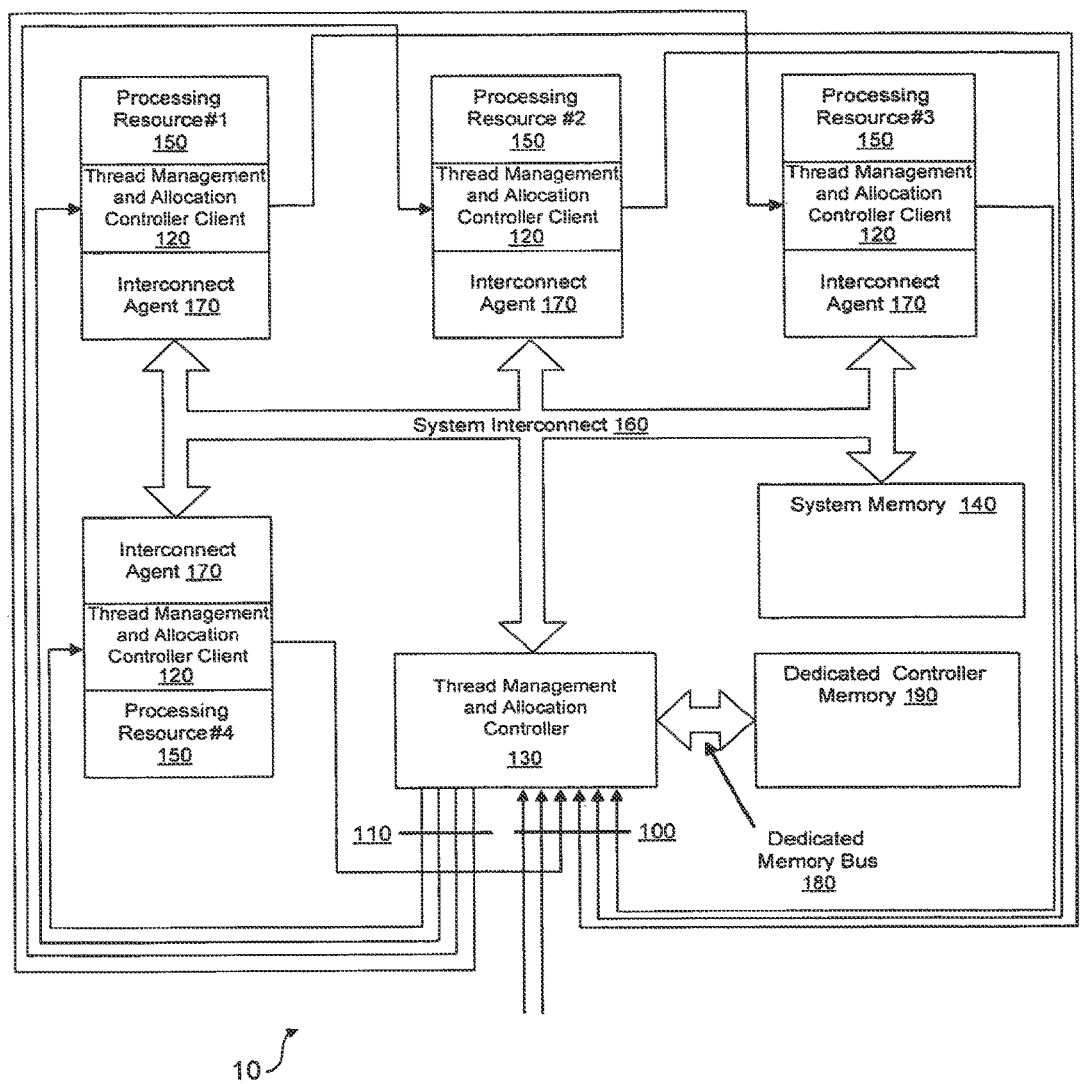
FIG. 2 shows a schematic block diagram of one exemplary implementation of the logical layout of FIG. 1, wherein a thread management and allocation controller is incorporated within a general purpose, multicore processor architecture, along with a dedicated memory device and a controller client.
Figure 3:
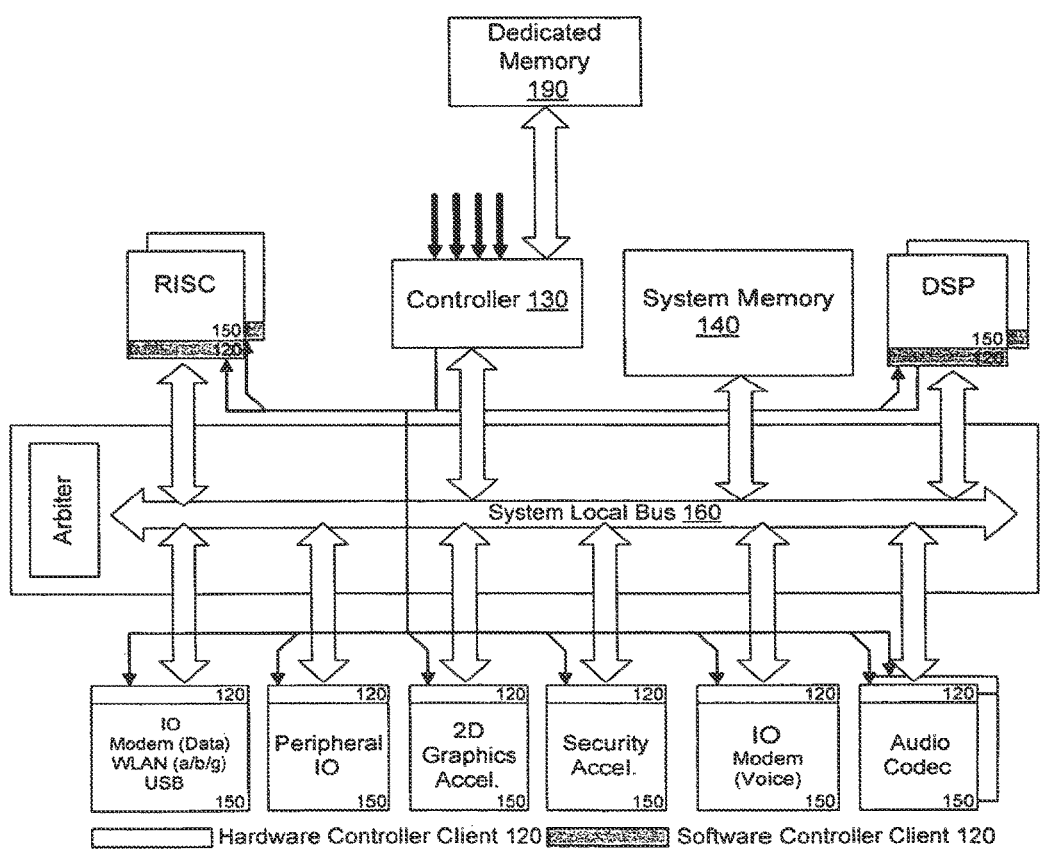
FIG. 3 shows, again in block diagram form, an example of a contemporary System on Chip (SoC) bus-based architecture incorporating the elements of FIG. 2.

FIG. 2 shows a multicore processor implementing the logical arrangement of FIG. 1, again by way only of an example. The multicore processor of FIG. 2 employs a plurality of the processing resources 150, each connected via a system interconnect 160. The system interconnect 160 communicates in turn with the controller 130 via input interfaces 100, and output interfaces 110. In the example of FIG. 3, the system interconnect 160 is laid out as a traditional central bus which connects each of the processing resources 150 with one another and with the controller 130, and also with the shared system resources 140 such as a system memory. Interfacing with shared system resources 140 may be achieved via any one of a number of currently available interface technologies. The memory may consist of any of the currently available central computer memory technologies, for example Static Random Access Memory (SRAM), Dynamic Random Access Memory (DRAM), or Double Data Rate Random Access Memory (DDR RAM).

As seen in FIG. 2, each of the multiple processing resources 150 has an associated controller client 120 configured to receive control information from the central controller 130, and to administer the processing resources 150 in accordance with the control information received. The function and purpose of the controller clients 120 is described in more detail below. Each processing resource 150 also has an associated interconnect agent 170 for communication with the controller 130 via the system interconnect 160. The interconnect agent 170 provides a generic interface to the controller client 120, which is independent of the underlying interconnect protocol in use on the system interconnect 160, i.e., it provides protocol translation between the communication protocols in use on the system interconnect 160 and the communication protocol in use by the controller client 120. Due to the use of an interconnect agent 170, the controller clients 120 of embodiments of the present invention may be used with any system interconnect protocol currently available. Indeed, the interface protocol 115 through which the controller client 120 communicates with the controller 130 may be physically distinct and of dissimilar nature to any or all of the interface protocols 160 deployed to enable communication between the processing resources 150 and shared system resources 140, for example, system memory.

The multicore processor 10, as a whole, is configured to execute a target application, which may be broken down into a number of individual tasks, called threads. Each processing resource 150 is allocated a suitable thread by the controller 130. This allocation is carried out according to a number of parameters, including, but not limited to, the priority of the thread in question, the availability of each processing resource 150 and the suitability of a particular processing resource 150 to the execution of a particular thread.

It is however to be understood that the addition of the controller 130 and its dedicated memory 190 do not otherwise require a redesign of the layout of the processor 10.

One specific arrangement is shown in FIG. 3 which shows a typical System on Chip (SoC) architecture, in block diagram form, and which illustrates the various processing resources 150 that might be placed under the control of the controller 130 in a practical application. It will be noted that the processing resources 150 may in particular be of relatively general capability, such as a DSP, or may of relatively limited functionality, such as a peripheral IO.

Figure 4:
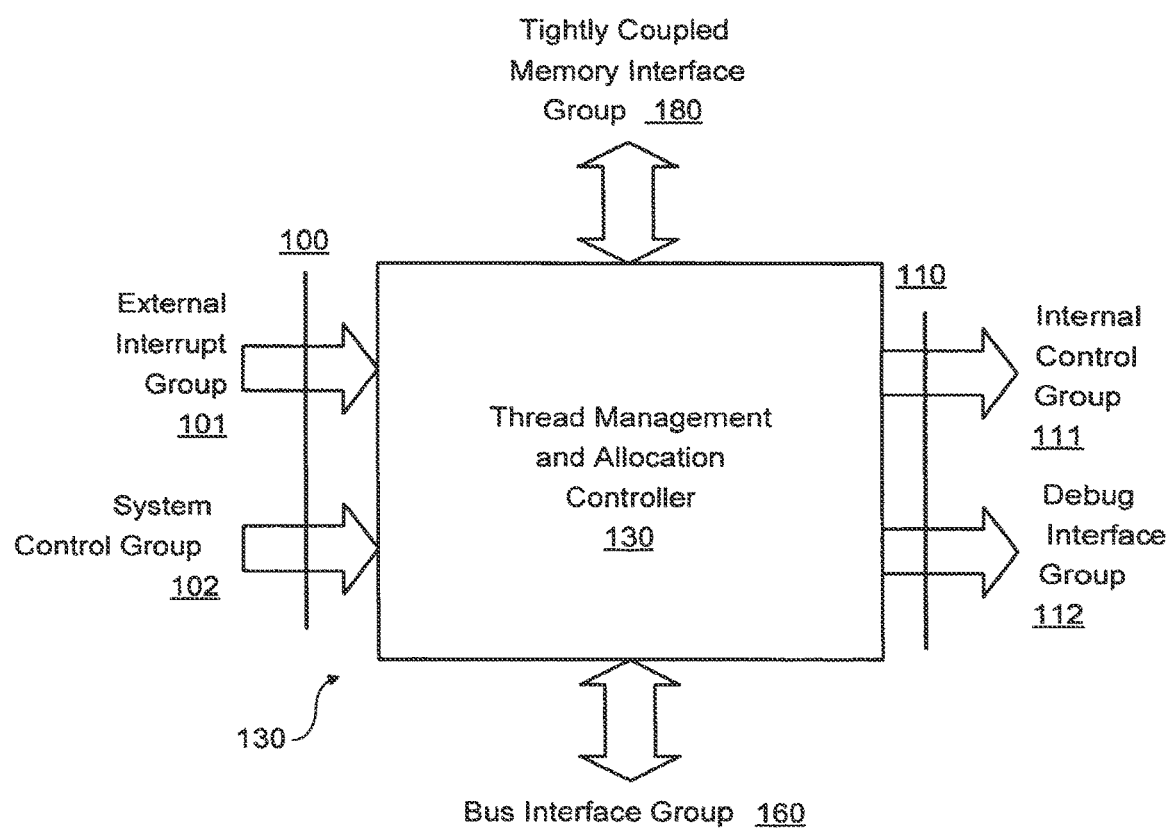
FIG. 4 shows a more detailed view of external connections to the controller of FIGS. 1, 2 and 3.

FIG. 4 shows the controller 130 and its associated input interface groups 100, output interface groups 110, and two bi-directional interface groups 160 and 180, each group being located on the periphery of the controller 130.

The system control group 102 comprises the miscellaneous signals required to ensure the correct operation of the controller 130. These include a system clock, a real time clock and a reset signal (RST). All output signals from the controller 130 are synchronous to the system clock, although they may be re-synchronised into other clock domains as is required by the system. All input signals to the controller 130 are synchronised to the system clock prior to processing. The RST input is a synchronous reset signal, for resetting the controller 130.

The external interrupt group 101 consists of a group of external interrupts sourced from outside the thread management and allocation system. Signals in the external interrupt group 101 may be driven from, for example, input interfaces with the outside world or directly from outside the multicore processor via pins. The number of external interrupt inputs may be defined during the multicore processor 10 design phase.

The internal control group 111 consists of a synchronous interrupt for each controller client 120 and its associated processing resource 150. Therefore the number of signals will typically correspond with the number of processing resources 150 within the system and will be defined during the multicore processor 10 design phase. The internal interrupt signal is an internal thread ready interrupt signal, indicative of a thread ready for execution, and that is being assigned to the particular processing resource 150 associated with that controller client 120.

The debug interface group 112 consists of three subgroups:

1. The auxiliary debug interface, which enables an external debug agent to gain debug access to the controller 130, and the system as a whole. Through this interface breakpoints and watchpoints may be set both internally and externally, and system state information may be read.

2. The trace buffer output, which is a streaming output providing run-time system state according to a set of pre-configured filtering guidelines and under the ultimate control of the debug manager 400.

3. External debug enable signals which may be used as breakpoint signals in their own right or may be combined with processing resource specific enables.

The particular format, construction and use of the above debug interface group will be described in more detail below.

The tightly coupled memory interface group 180 interfaces the controller 130 to its own dedicated tightly coupled memory resource 190.

Figure 5:
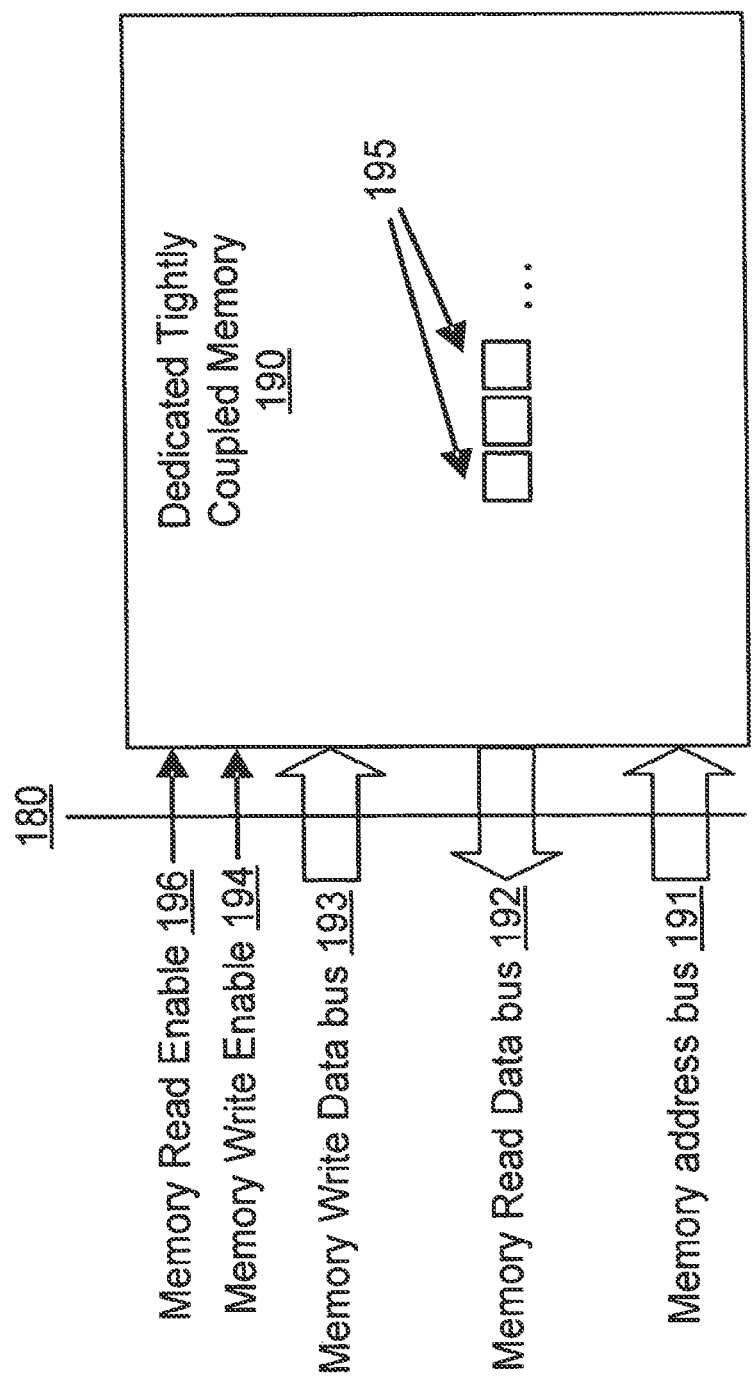
FIG. 5 shows a more detailed view of the memory device of FIGS. 2 and 3.

FIG. 5 shows a typical structure of the dedicated tightly coupled memory 190. The width of the address path and the datapath are defined during the multicore processor 10 design phase. The dedicated tightly coupled memory interface 180 includes a memory address bus 191, a memory read data bus 192, a memory write data bus 193 and write 194 and read 196 enable signals.

The attached memory is assumed to be a synchronous SRAM device. The dedicated tightly coupled memory 190 contains an integer number of controller memory elements 195, as defined during the multicore processor 10 design phase, according to the needs of the target application. In the currently preferred embodiment, each controller memory element 195 consumes 256 bits of memory space. Again in the currently preferred embodiment, the controller supports a maximum of 65536 controller memory elements (i.e. a 16 Mb memory). Although queue descriptors, as described later, do consume controller memory elements 195, in a typical system the number of controller memory elements 195 required would be dominated by thread support requirements. For example, a system capable of supporting 400 threads simultaneously within the controller 130 would require approximately 128 kb of attached memory.

The interconnect interface group 160 of FIG. 4 conforms to the chosen interconnect protocol or protocols used in the multicore processor 10, and the interconnect agent 170, which is defined during the multicore processor design phase. In the case where there are multiple distinct interconnect structures, the interconnect interface group 160 may consist of multiple, possibly dissimilar, interfaces. In the embodiment shown, a bus interface is used. It will nevertheless be apparent that various other forms of interface could equally be employed, as suggested previously.

Controller Subblock Description and Functions

Figure 6:
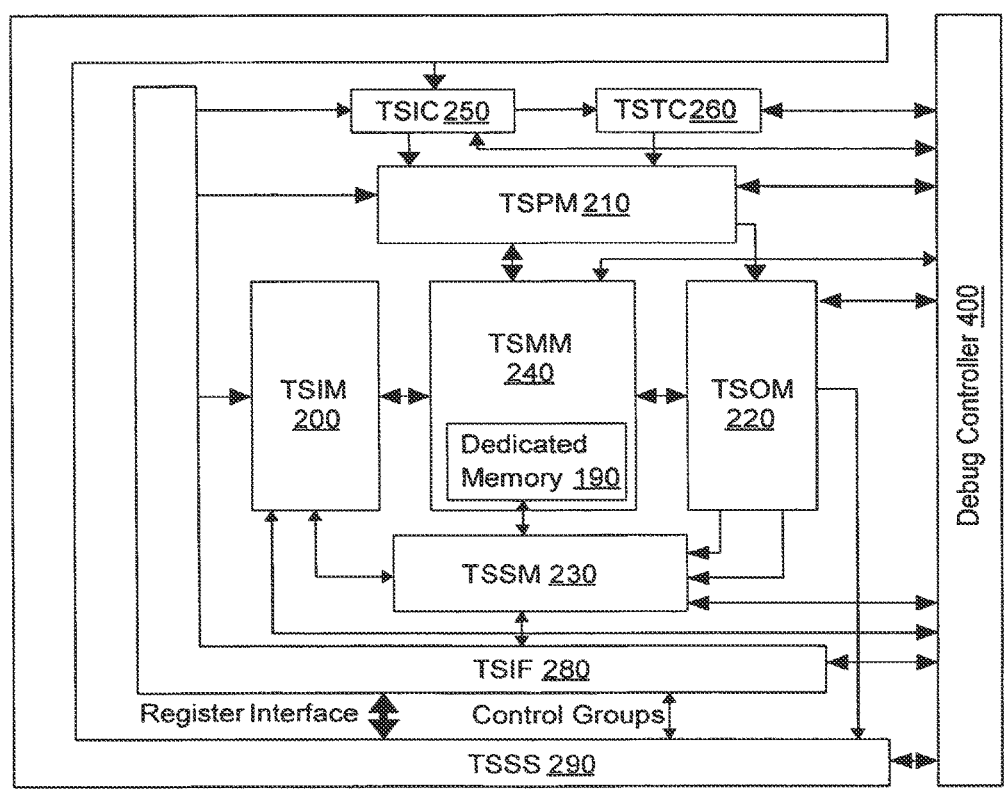
FIG. 6 shows a more detailed view of the internal composition of the controller of FIGS. 2, 3 and 4.

FIG. 6 shows the main logical components of the controller 130. The functionality of the controller 130 is split amongst four primary internal parallel processing subblocks, performing the following functions:

1. A Thread Input Manager (TSIM) 200, configured to maintain a list of free controller memory elements 195 within the dedicated tightly coupled memory 190, and to oversee controller memory element 195 recovery.

A Thread Synchronisation Manager (TSPM) 210, configured to maintain Pending lists and a timer queue within the dedicated tightly coupled memory 190 and to perform synchronisation between threads, and to perform promotion of threads to Ready queue structures within the dedicated tightly coupled memory 190, as required. The Thread Synchronisation manager 210 maintains the integrity of the pending lists and timer queue structures via insertion and extraction of pending thread descriptors within the dedicated tightly coupled memory 190.

3. A Thread Output Manager (TSOM) 220, configured to maintain Ready queue structures within the dedicated tightly coupled memory 190, and Dispatch queues for each processing resource 150 within the dedicated tightly coupled memory 190. Maintenance of the integrity of the ready queue structures is performed by insertion and extraction of thread descriptors held in controller memory elements 195, within the dedicated tightly coupled memory 190.

4. A Thread Schedule Manager (TSSM) 230, configured to provide scheduling decisions for each processing resource 150 within the ready queue structures located within the dedicated tightly coupled memory 190.

Additionally a number of secondary processing subblocks provide support functions:

5. A Thread Memory Manager (TSMM) 240, configured to provide aggregate access to the attached dedicated tightly coupled memory 190, including mutual exclusivity and locking.

6. An Interrupt Manager (TSIC) 250, configured to convert incoming external system interrupts into internal synchronisation primitives.

7. A Time Manager (TSTC) 260, configured to provide timer functions for synchronisation purposes and watchdog timer functionality to each processing resource 150.

8. A System Interface (TSIF) 280, providing interfacing between software commands received from the multicore processing resources 150 and the individual sub-blocks within the controller 130.

9. A Server Shim (TSSS) 290, configured to provide physical interfacing 115 between the controller 130 and the multicore processing resources 150.

Each of the primary and secondary subblocks listed above also include a debug output, forming part of a debug interface 112, for informing a debug controller 400 of the present invention of events occurring within each subblock corresponding to that signal. Where a command may complete with particular conditions, status flags are administered within the subblock.

In general terms, the controller 130 manages threads by maintaining a number of queue structures within the dedicated controller memory 190. These queue structures include Pending, Ready, Timer and Dispatch queues. Threads awaiting execution are held in one or more of these queues, and are allocated to suitable processing resources 150 once they become ready. Manipulation of the threads within the queues is mainly carried out using push, pop and sort operations.

There now follows a detailed description of the interaction of the above primary and secondary processing sub-blocks within the controller 130.

Each sub-block presents a set of functions to other sub-blocks, enabling each to instruct its peers to execute manipulations on their respective maintained structures within the dedicated tightly coupled memory 190. Functions are called by a particular subblock, on receipt of a similar command received at a controller software Application Programming Interface (API).

Thread Input Manager Functions:

The thread input manager 200 provides three public functions to other sub-blocks within the controller 130.

The FreeListStatus function returns the head pointer and number of elements within the controller memory element 195 free list. The free list is a list of the controller memory elements 195 that are currently unused. This function can only be called by the system interface 280, on receipt of a similar command at the controller 130 software API The PushFreeIndex function is used to push a liberated controller memory element 195 index back onto the free list. This function can only be called by the thread Schedule Manager 230.

The PopFreeIndex function is used to pop a free controller memory element 195 index from the free list. It is typically called from within the API call service routine within the system interface 280.

Thread Synchronisation Manager Functions:

The Thread Synchronisation Manager 210 provides seven public functions to the other sub-blocks within the controller 130.

The first five of the following 7 functions can only be called by the system interface 280, in response to similar commands received by the controller 130 software API.

The AddThread function is used during runtime to add a dependant thread to a given pending queue.

The TimingQueueGetStatus function returns the head pointer and a number of elements within the timer queue.

The TimingQueueSetStatus function sets the head pointer and number of elements within the timer queue.

The PendingQueueSetStatus function sets the status of the pending queue descriptor list.

The PendingQueueGetStatus function returns the head pointer and number of elements within the pending descriptor queue.

The SyncPrim function is used to issue a synchronization primitive to a given pending queue. This function is called by either the thread interrupt manager 250 or the system interface 280.

The TimeoutPrim function is used to issue a timer based synchronisation primitive to the timer queue. This function is only called by the time manager 260.

Thread Output Manager Functions:

The Thread Output Manager 220 provides six public functions to the other sub-blocks within the controller 130.

The PushIndex function places a thread descriptor within the ready queue structure. The method may be called by either the system interface 280 or the Thread synchronisation manager 210, and it may be called with high priority to expedite processing speed (for example, to handle interrupts). Where threads are independent (immediately ready) the call will be made from the system interface 280, where the thread descriptor originally had dependencies the call is made from the thread synchronisation manager 210.

The following three functions can only be called by the system interface 280, in response to the receipt of a similar command at the controller 130 software API The DispatchQueueGetStatus function returns the head pointer and number of elements within the dispatch queue list.

The DispatchQueueSetStatus function sets the head pointer and number of elements within the dispatch queue list.

The DispatchQueueSetMetrics function sets the metrics of the currently executing thread such that informed pre-emption decisions can be made.

The DispatchQueueEvent function propagates a scheduling event from the ready queue structure to the dispatch queues administered by the Thread Output Manager (TSOM) 220. This function is only called by the Thread Schedule Manager (TSSM) 230.

The DispatchQueuePop function pops a thread descriptor from the head of a dispatch queue.

Thread Schedule Manager Functions:

The Thread Schedule Manager 230 provides two public functions, one to the Thread Output Manager 220, and one to the system interface 280, both of which are located within the controller 130.

The Schedule function is called by the thread output manager 220, immediately after it adds a thread descriptor to a ready queue structure or removes a thread descriptor from a dispatch queue structure.

The FreeIndex function is called by the system interface 280, to liberate controller memory elements 195 after they are popped from the dispatch queue. The requests are filtered through the Thread Schedule Manager 230 command interface to ensure that all related scheduling will be guaranteed complete prior to the release of the controller memory element 195.

Controller Client

As described earlier, the term processing resource 150 is applied to any resource that may execute an instruction, regardless of how rudimentary the instruction may be. Therefore resources that have a fixed function, such as an input/output module, are also included. Depending on the type of processing resource 150, the connection between the system interconnect 160 and the processing resource 150, via the controller client 120 may be either uni-directional or bi-directional.

Figure 7:
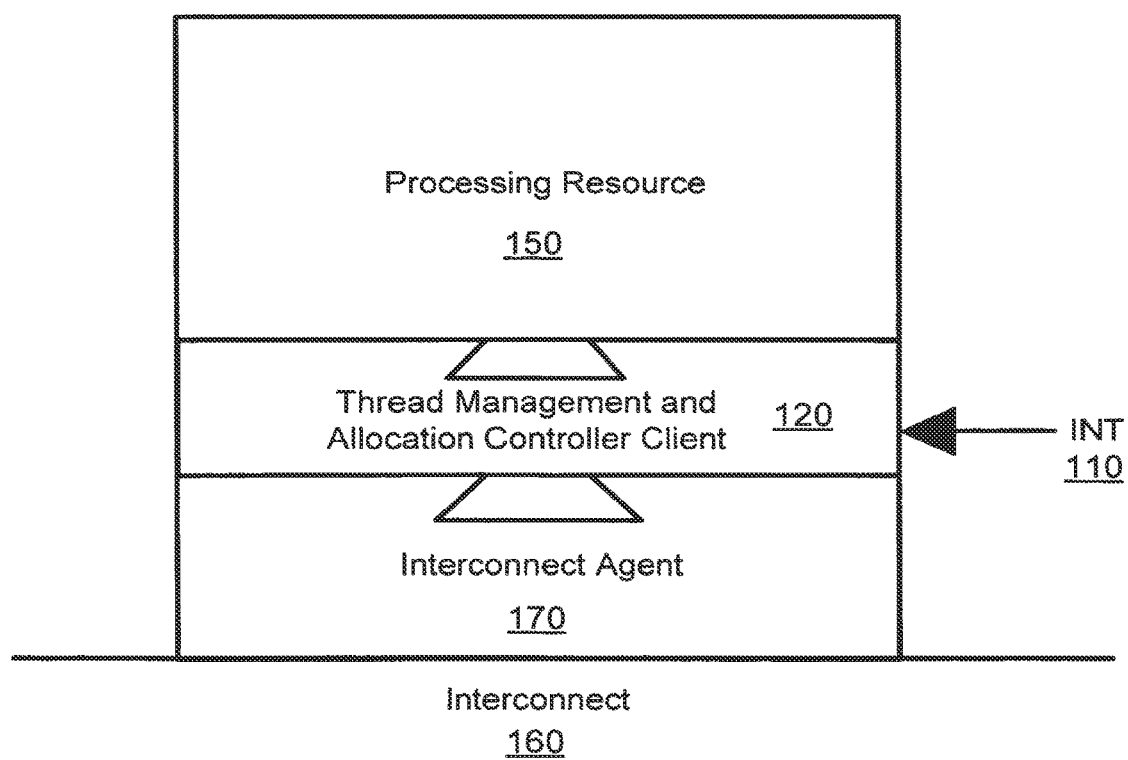
FIG. 7 shows a schematic block diagram of a controller client as shown in FIGS. 2 and 3.

FIG. 7 shows a schematic block diagram of a controller client 120 for use with the controller 130.

On appropriate processing resources 150, for example general purpose processors or Digital Signal Processors, the controller client 120 will typically be implemented in software. However, where the processing resource 150 is of limited function, the controller client 120 will require a hardware component.

When a hardware component is used, the controller client 120 still interfaces to the processing resource 150 using the same interface. That is to say, the controller client 120 presents an identical interface to the interconnect agent 170 as that of the processing resource 150 to the controller client 120. In some cases, it is appropriate to treat the data path into the processing resource 150 as distinct from the data path out of the processing resource 150, for example in the case of an Input/Output device.

In addition to the main interface, the controller client 120 also provides out of band interfaces for use as outputs for run-time and debug events. Where a software controller client 120 is used, these are provided using standard interrupts, calling appropriate service routines, or form inputs to processing resource 150 specific debug and trace units 151.

Controller Client Mode of Operation:

Each controller client 120 is fully interrupt driven. Upon receipt of an internal interrupt from the controller 130, the controller client 120 pops the thread descriptor from the head of the dispatch queue associated with that particular processing resource 150, which is held in the dedicated tightly coupled memory 190. The unique reference within the thread descriptor is then used to read further thread control information, the Thread Control Block (TCB), from the main memory resource 140. The information contained within the TCB may be any of:

1. Controller client 120 configuration content. This information may be used to configure controller client 120 system resource usage policing, address or data-bus trigger configuration (for debug purposes), data presentation mode, and the like.

2. Processing Resource 150 Configuration content. This is information required to prepare the processing resource 150 for execution of a particular thread. This may include recovery from a previous partial execution of this thread or configuration of a specialist hardware accelerator, such as an audio CODEC.

3. Instruction content. In the case of a fixed function hardware accelerator, the "instruction" will be implicit in the targeted hardware processing resource 150, for example an output instruction when the processing resource 150 is an output module, and any required specialisation or configuration will be accommodated within the configuration information. In the context of a software controller client 120, this will typically be a pointer to the function code associated with the thread.

4. Data content. This content may define the start address or multiple addresses in the system memory 140 and range of data over which the thread may operate.

5. Controller client 120 post-processing content. This content determines the actions of the controller client 120 after the completion of the thread execution.

There are three distinct phases of operation of the controller client 120:

1. Configuration phase, where the processing resource 150 and the controller client 120 are prepared for execution of a particular thread. In the simplest case the configuration phase will be null.

2. Execution phase, where the thread is being executed and the controller client 120 may be supplying data or monitoring resource utilization.

3. Completion phase. Completion of processing may result in no action, the creation of another thread, the issuance of a synchronisation primitive or a combination of thread creation and synchronisation. Furthermore, the controller client 120 may also be required to set or update scheduler metrics and terminate threads. In the event that, during execution of the thread, further memory is required to store results, the controller client 120 must also execute this server method.

As mentioned previously, the controller client 120 may be implemented in software. In this case some of the functionality of the controller client 120, for example shared resource usage policing, will typically make use of existing hardware components which may already be present in the processing resource 150 hardware (for example, a memory management unit (MMU)).

Consequently, the software controller client 120 architecture and implementation is partially processing resource 150 specific.

Hardware controller clients 120 may also have special requirements according to the idiosyncrasies of the associated processing resource 150. The following section describes a generic architecture which will be suitable in the majority of cases.

General Example of a Hardware Controller Client

Figure 8:
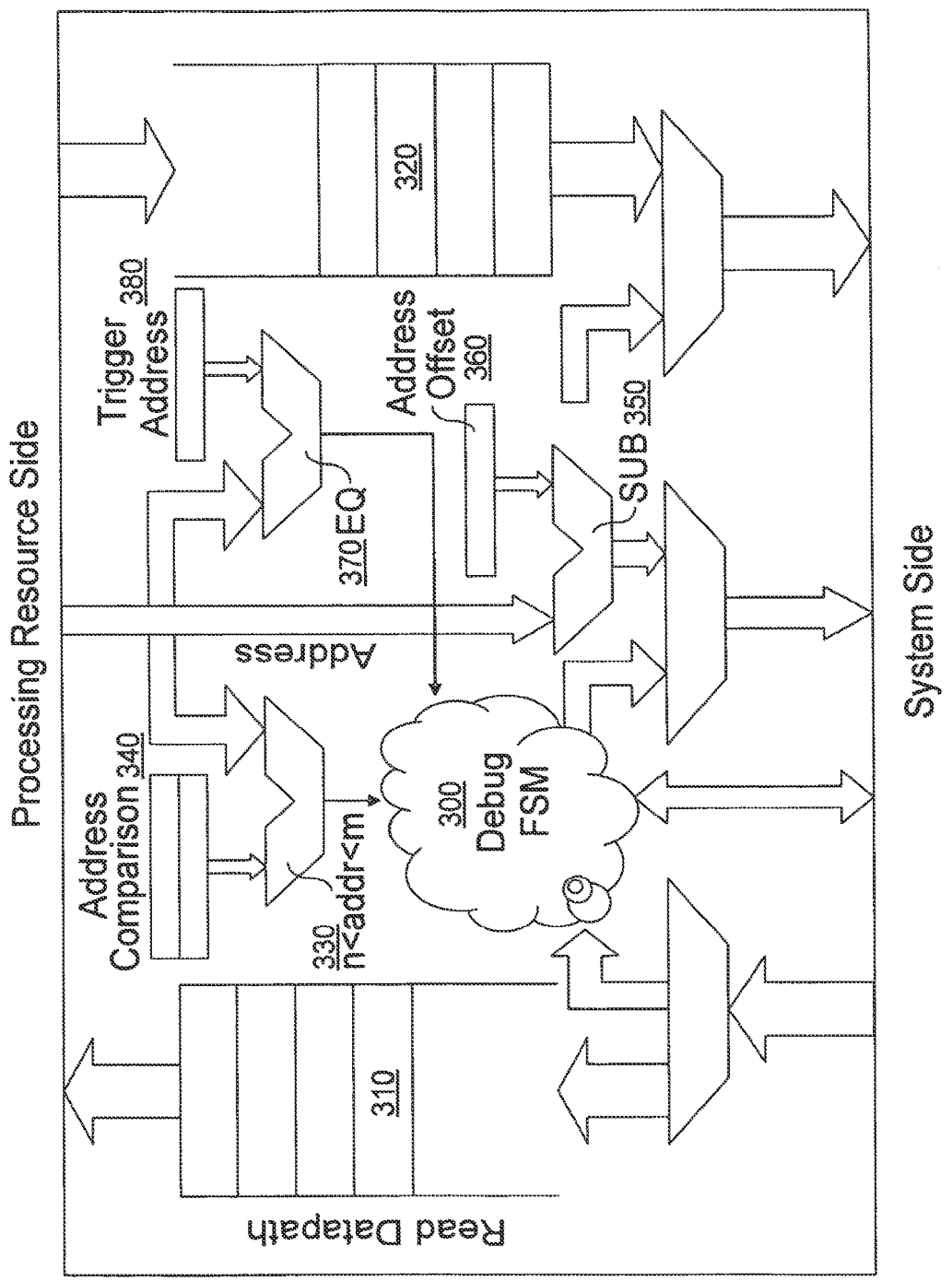
FIG. 8 shows a more detailed schematic block diagram of a hardware controller client.

The basic structure of the hardware controller client 120 is shown in FIG. 8. At the functional heart of the design is the controller client Finite State Machine (FSM) 300. This Finite State Machine (FSM) 300 may be active during all three phases. The controller client FSM 300 is activated by an interrupt 111 from the controller 130.

Firstly the controller client FSM 300 masters the system interconnect 160 to read the TCB from the shared memory resource 140, which contains a reference to its own instructions. During the configuration phase the controller client 120 may master the processing resource interface, interpreting configuration commands and translating them into write cycles issued to the processing resource 150. Furthermore, the controller client 120 configures its own resource policing. The manner in which the transition from the configuration state to the executing state is processing resource 150 specific, but may be marked by an explicit execute primitive or merely an entry into a data transferral state.

From a controller client 120 perspective the simplest architecture has an identical interface protocol on both the processing resource 150 and the system side. In this case, during the execution phase, processing resource 150 read and write cycles are simply mapped across to the system interface with checking where appropriate.

The simplest controller client 120 implementation would require a FIFO style interface in both the system to processing resource 310 and processing resource to system 320 paths. During the execution phase of a controller client 120 of this nature, data can be presented to a processing resource 150 by message or streaming modes. Message mode, where the entire dataset is accumulated locally within the controller client 120 prior to processing, engenders a more coarse grained blocky interconnect behaviour which may facilitate more complex interconnect arbiters. Streaming mode, where data is streamed directly from the system memory 140 into the processing resource 150, presents a more silicon efficient solution requiring more careful consideration of hand-shaking and exhibiting fine grained interconnect transactions and tight coupling to interconnect performance.

The transition from the execution to the completion phase may be inferred, by measuring the presentation of data to the processing resource 150, or explicitly signalled by the processing resource 150 itself. During the completion phase, the controller client 120 once again executes from the set of instructions provided by the original thread control block.

Note that, in some cases, it is appropriate to treat the datapath into the processing resource 150 (for example an input/output device) and the path out of the processing resource 150 as distinct. In contrast it will be natural in some cases (for example, algorithmic accelerators such as DSPs) to couple the consumer and the producer of data within the same controller client 120 framework.

In order to provide a level of decoupling between the processing resource 150 and the other system resources, a number of additional facilities may also be provided by the controller client 120:

a) Addresses generated by the processing resource 150 may be checked against expected behaviour as defined by a base address and offset definition, by using a comparator 330 and a comparison address register 340.

b) Addresses generated by the processing resource 150 may be offset, using a subtractor 350 and offset address register 360, enabling the processing resource 150 to have a normalised view of the address map for any given thread, typically normalised around address 0x0.

c) A debug watch register may be included where the processing resource is of limited functionality and therefore does not include its own instruction level debug hardware. Such a register can then be used to monitor address usage for enabling instruction level debug capabilities to the otherwise lacking fixed function hardware resources 150.

Instances of datatypes used within the controller 130 are divided into public (visible from and manipulated by the system at large) and private visibility (visible only within the controller 130 and manipulated only by the controller 130 sub-blocks). To ensure portability of the design across multiple end applications, all thread, queue and aggregated queue descriptors are stored within the dedicated tightly coupled memory 190 using a common base class, the controller memory element 195.

Each controller memory elements 195 may represent any of ten descriptor types:

1. Free List Element. This element is free for usage by any of the other descriptor types. No user initialization or runtime manipulation is required.

2. Thread descriptor (TD). This is a data structure representative of an application/administration thread. This descriptor may exist in either a pending queue, a Ready queue or a dispatch queue within the dedicated tightly coupled memory 190. No user initialization is required, but runtime manipulation is required.

3. Scheduler Root Descriptor (SRD). This is the top descriptor of a scheduler hierarchy. User initialization is required, but no runtime manipulation is required. The root descriptor has no parent, but children can be any of: an SSTD, a DSTD or a TD.

4. Static Scheduler Tier Descriptor (SSTD). This is a static scheduler tier descriptor, whose parent may be either an SRD or another SSTD. The SSTD's children can be any of: another SSTD, a DSTD or a TD.

5. Dynamic Scheduler Tier Descriptor (DSTD). This is a dynamic scheduler tier descriptor. User initialization is not required, but runtime manipulation is required. The parent of a DSTD may be either an SRD or an SSTD, but a DSTD may only have TD children.

6. Dispatch Queue Descriptor. This type of descriptor describes a list of thread descriptors, which are waiting for pop operations from the associated processing resource 150. User initialization is required including depth watermarks, but no runtime manipulation is required.

7. Pending Queue Descriptor. This type of descriptor describes a list of thread descriptors, which are awaiting a synchronisation event. User initialization is required, but no runtime manipulation is required.

8. Pool Attachment Node (PAN). PANs are used to attach the scheduler root tier to the processing resource 150 pool root tier. User initialization is required, but no runtime manipulation is required.

9. Pool Static Node (PSN). PSNs are also used to attach the scheduler root tier to the processing resource 150 pool root tier. User initialization is required, but no runtime manipulation is required.

10. Pool Root Node (PRN). There is a single PRN for each processing resource 150 pool. User initialization is required, but no runtime manipulation is required.

Figure 9:
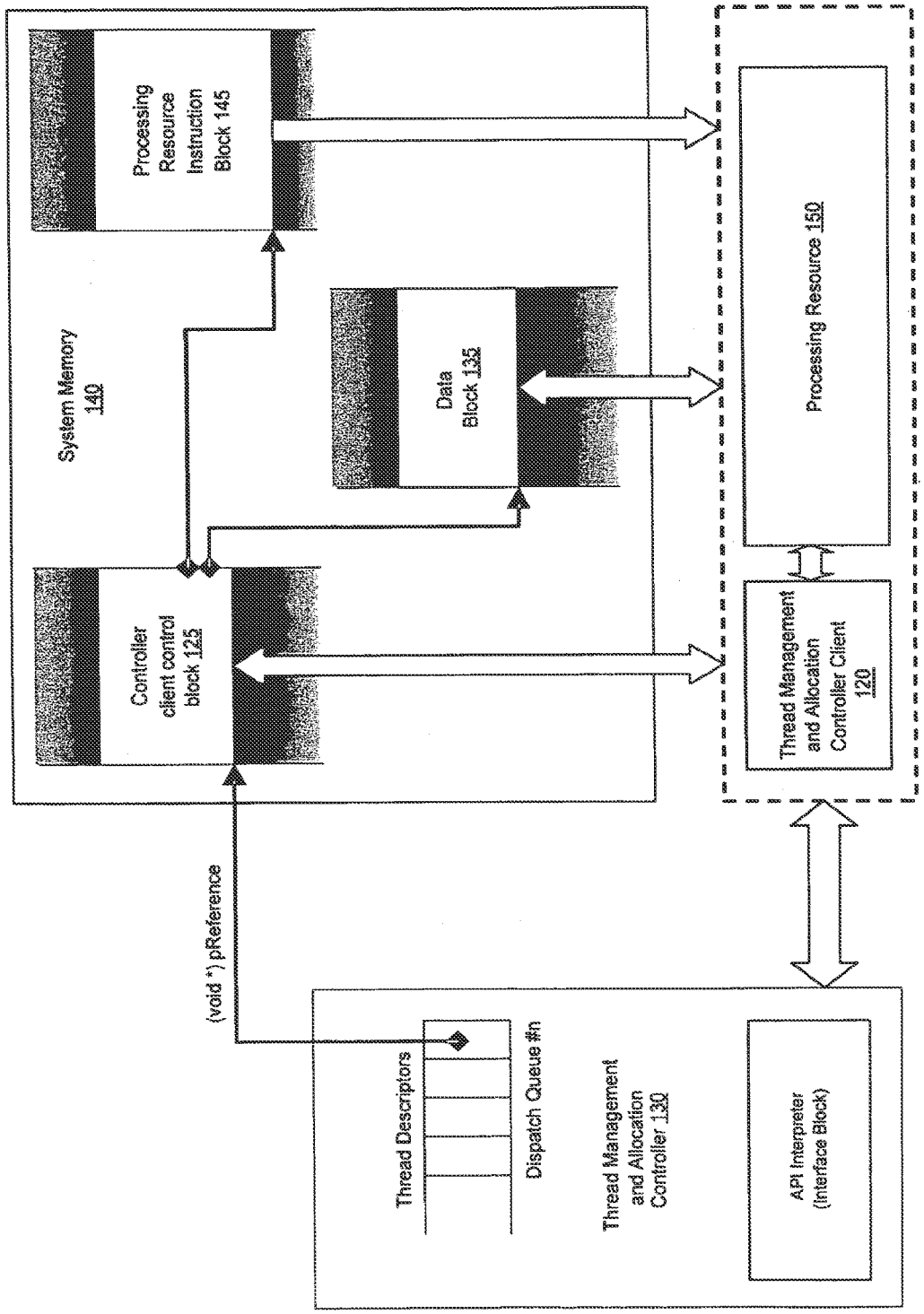
FIG. 9 shows a typical relationship between a thread descriptor, the controller, a processing resource and the shared system memory.

FIG. 9 shows a typical relationship between a thread descriptor, the controller 130, a processing resource 150 and the shared system memory 140. Each thread primitive contains a unique reference, pReference. This reference is not interpreted or modified by the controller 130. pReference provides a pointer to a data structure in system memory 140 defining the task to be executed. Typically this would be a controller client control block 125, and would contain at least the following elements: a Function pointer (shown in FIG. 9 as a processing resource instruction block 145), a Stack Pointer and an Argument Pointer (shown together in FIG. 9 as a data block 135). Additional fields may be defined which provide in-band configuration or security over shared system resources.

However, according to the application and/or target processing resource 150 the complexity of the controller client control block 125 may vary. In particular, note that further levels of indirection may be included which, given appropriate "control" instruction code and corresponding "datapath" code, may enable disparate processing resources 150 to execute the same functions on the same data under certain circumstances. In this case, there are pointers for each type of processing resource 150, corresponding to the particular instruction stream required by the dissimilar processing resource 150. The ability to allow dissimilar processing resources to execute the same threads also enables load balancing to be carried out across all processing resources available within the multicore architecture. Furthermore, processing resources may be pooled together.

Processor resource pools enable the aggregation of instances of a specific processing resource 150 into a single distribution node. The distribution nodes may then provide load balancing, intelligent pre-emption and power management across the individual processing resources 150 that belong to a particular processing resource pool.

Figure 10:
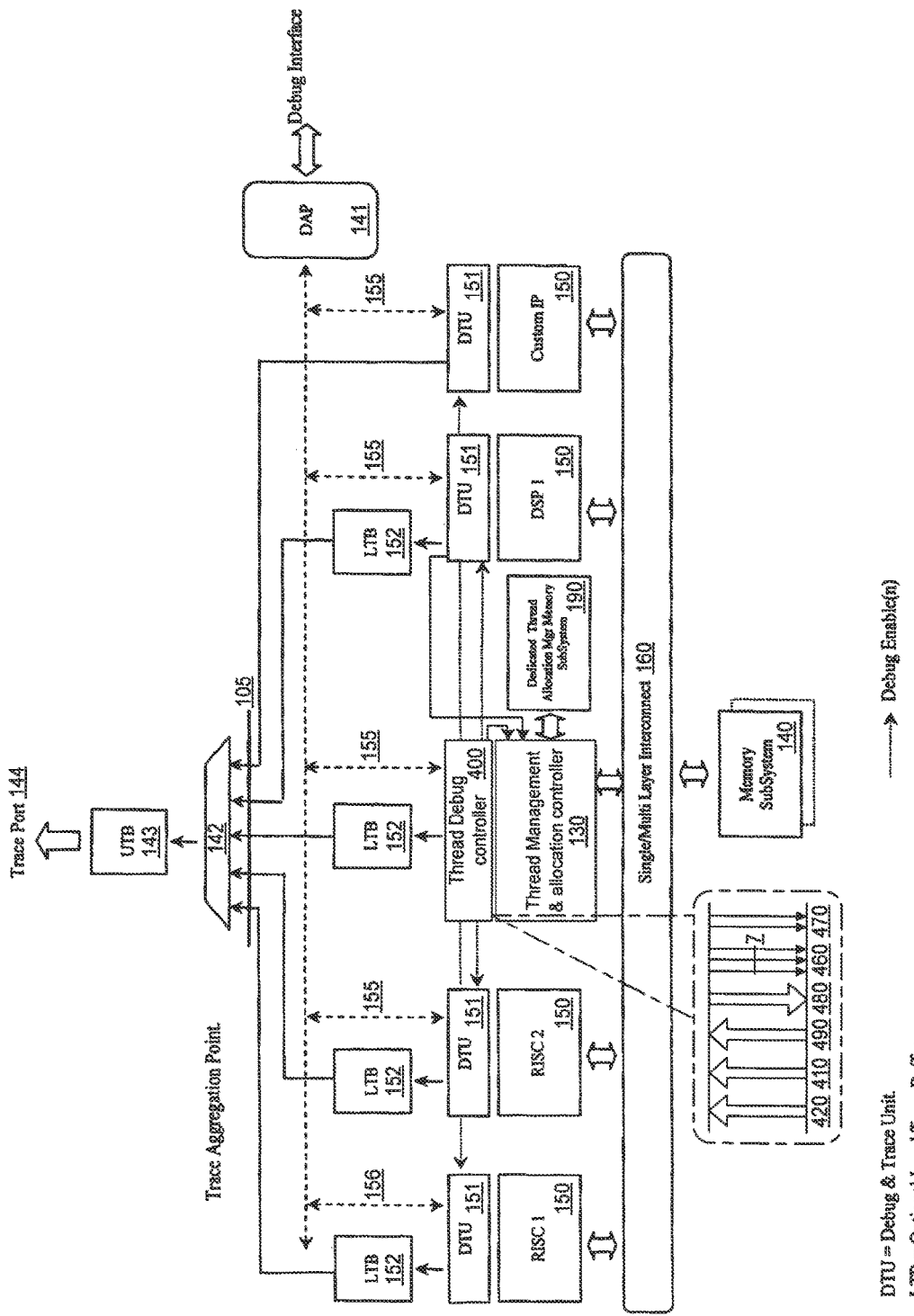
FIG. 10 shows a schematic block diagram of one exemplary implementation of the logical layout of a typical multicore processor architecture system incorporating a debug architecture in accordance with an embodiment of the present invention.

FIG. 10 shows the basic schematic layout of a debug system framework incorporating features that are in accordance with an embodiment of the present invention.

Typically, each processing resource 150 provides an instruction level debug and trace unit 151, for use at the instruction level, or equivalent, and only local to the associated processing resource 150. These are processing resource 150 specific, however operate using the same or similar data.

Broadly speaking, the approaches to debug can be split into two areas. Static operations, where the system is halted during the extraction of debug information, and dynamic operations where information is gathered, monitored and distributed at run-time.

Static operations include, amongst other things, setup configuration of breakpoints and watchpoints, the management of halt and single step, snapshots of system state and memory load, observation and analysis.

Dynamic operations include, amongst other things, the monitoring of processor cycles, cache operations, inter-processor communication and system interconnect (e.g. bus) transactions. This type of monitoring is collectively referred to as trace, and it is used in the "profiling" of system behaviour. Dynamic debug, or trace, information is typically generated autonomously by the components of the embedded system.

The local instruction level debug and trace units 151 contain embedded "trigger" logic that causes the processing of instructions within the associated processing resource 150 to halt under certain pre-defined circumstances, but may also be used to initiate or terminate the accumulation of trace information, or some other function. The trigger is typically an event bit which indicates that the predefined "trigger sequence" has been observed.

As a minimum, such trigger logic typically includes breakpoint logic which issues an interrupt (trigger) to the local processing resource 150 when a given instruction is encountered. The amount of functionality that is contained within these units is processing resource 150 specific, however, where required, as mentioned previously, the controller client 120 can include debug watch registers to provide a minimum level of instruction level debug and trace capability. This would be required when the processing resource 150 was of limited function, for example, a dedicated Audio CODEC.

Each of the instruction level debug and trace units 151 have a bi-directional interface 155 connected to a Debug Access Port 141 and a trace output interface 105 connected to a trace port 144 via one or more optional local trace buffers 152, a trace aggregation point 142, and an optional unified trace buffer 143.

The Debug Access Port 141 allows an external "debug host", to control and to access the debug process. Typically, these hosts interface through a serial port or other similar low speed connection interface protocol.

The trace port 144 provides access to the trace data to outside devices. This allows observation of the trace data to occur, as part of the software debug process.

The optional local trace buffers 152 and unified trace buffers 143 are used to temporarily store trace data before output. This allows a running "snap shot" of the system to be stored, and then read out through the trace port 144 at some later point. By doing this, the trace port 144 does not have to be capable of the potentially high transfer speeds required, should the debug data be outputted in real time. This removes the requirement for a large number of output pins that are (at least in part) dedicated to debug data output. This is important, since at present, it is the number of input/output pads that can be fitted onto any particular Integrated Circuit (IC) die that restricts size of the IC die, as opposed to the size of the functional logic itself.

The trace aggregation point 142 simply serves to multiplex the multiple debug trace streams 105 outputted from the local debug and trace units 151 into a single output stream, ready for either storage in the unified trace buffer 143 or simply for output across the trace port interface 144 in the case of no unified trace buffer 143 being present.

Connected to each of the local debug and trace units 151, is the thread debug controller 400 of the present invention. This thread debug controller 400 is also connected to the controller 130, debug access port 141 and the trace output port 144, again via one or more optional local and unified trace buffers.

FIG. 11 shows the specific inputs and outputs of the thread debug controller 400 of an embodiment of the present invention.

Each of the controller 130 subblocks 200 to 280 has a debug interface 410 for carrying signals into the thread debug controller 400. These input signals notify the thread debug controller 400 of events happening in each of the corresponding subblocks of the controller 130, as the subblocks interact to manage and allocate individual threads between the individual processing resources 150. The thread debug controller 400 can also filter subblock events for trace and trigger information.

Command execution within each subblock of the controller 130 results in the sending of an EventID field and an EventData field to the thread debug controller 400. The subblock to which each event relates is determined by which interface these fields are sent over, as each subblock has its own dedicated interface 440 to the thread debug controller 400. The EventID field is user definable, therefore can be N bits long, however in a preferred embodiment of the invention, the EventID is four bits long. Each individual EventID field identifies an individual event occurring in a particular subblock 200 to 280.

Examples of events that might occur within the subblocks include pushing/popping of threads to or from queues, read/write access to a Controller Memory Element 195, generation of synchronisation events and events that provide a form of low level communication between processing resources 150 and the controller 130.

The EventData field that accompanies each EventID is, in the currently preferred embodiment, 32 bits long. This field contains the main data used by the event currently being executed. Usually this contains the 32 bit long pReference field of the Controller Memory Element 195, however it may also include any one of a number of other data types, or combinations of these datatypes when each datatype is less than 32 bits long. Examples of these other datatypes include Controller Memory Element 195 indices, interrupt masks, timer values and sub-module IDs.

The thread debug controller 400 also has a Time interface 420. This interface provides a 32 bit time indication, which is used by the thread debug controller 400 to time stamp all events logged, as the thread debug controller 400 receives them from each of the individual subblocks of the controller 130, via the subblock input interfaces 410.

The Auxiliary debug interface 430 is a bi-directional interface for enabling standard external software debug and system visualisation and control tools to access the thread debug controller 400. These external software debug tools are used to both set up the debug parameters on initialization of the system, and to capture and display the resultant trace data. Examples of the interfaces supported include the IEEE 1149.1 JTAG interface and the more capable IEEE Nexus 5001 AUX port Interface.

Originally intended for boundary scan of chip devices, JTAG, is a technology based on a 4-wire interface comprising serial links and low speed clocking strategies, that is now used extensively within multicore architectures for enabling debug data access. Due to its bandwidth limitations, and the fact that the interface is mastered by the debug host over a slow serial link, the use of JTAG is typically limited to static operations. However, since it is relatively cheap (in terms of silicon area and chip I/O) and easy to implement, JTAG has become the standard physical layer for on-chip debug purposes.

The Nexus 5001 AUX port Interface provides a richer set of debug capabilities, including extensive dynamic activities, such as dynamic access to debug registers internal to the thread debug controller 400.

Figure 12A:
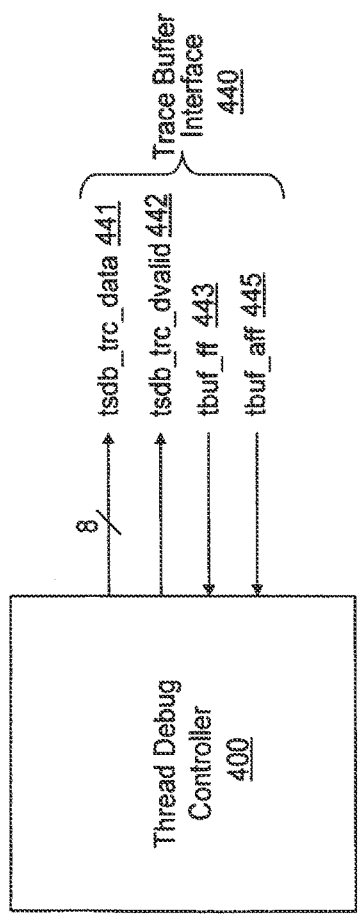
FIG. 12*a* shows a more detailed view of the external connections to the trace buffer of the thread debug controller of FIG. 10.
Figure 12B:
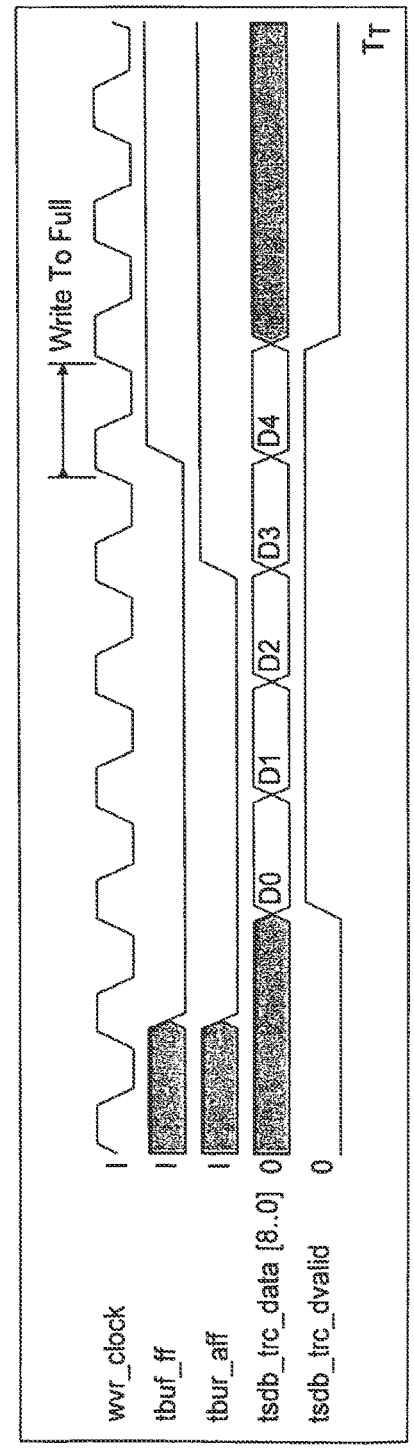
FIG. 12*b* shows a timing diagram of a typical output of the trace buffer of FIG. 12*a*.

The trace buffer interface 440 is designed to be used with any currently available buffer technology. In the specific embodiment, the trace data is outputted through a simple byte wide First In First Out interface. FIG. 12*a* shows the byte wide interface and its associated control signals, while FIG. 12*b* shows the timing of the electrical signals forming these data and control inputs/outputs. Whilst a single byte wide interface is shown, it would be understood to the skilled person that the invention is not so limited in scope.

Referring back to FIG. 11, the external debug enable signal group 450 are all local debug and trace unit 151 enable signals. There is one provided for each local debug and trace unit 151 present within the multicore architecture 10, therefore the exact number is set during design phase. Each of these signals may enable a particular local debug and trace unit 151 upon detection of a trigger event. By using such local debug and trace unit 151 enable signals, and due to the inherent thread level abstraction of operation of the controller 130, the thread debug controller 400 provides a thread (i.e. macro-architectural) level debug capability that can be gated with the local instruction (micro-architectural) level of the local debug and trace units 151. This provides both a coarse-grained thread based debug and a finer grained instruction based debug to software engineers, thereby facilitating the debug process, without introducing additional debug software that would otherwise cause probe effects.

It is to be noted that the thread debug controller 400 also provides a number of fine-grained debug capabilities to the subblocks that make up the task allocation controller 130. These will be described in more detail in relation to FIG. 13 below.

The Internal debug enable signal group 460 consists of signals that are sent by the thread debug controller 400 to each of the individual subblocks (200-280) that make up the task allocation controller 130. These are used to allow the thread debug controller 400 to make each subblock single step through its next instructions, or to halt the subblock entirely, according to the configuration of the thread debug controller 400.

The thread debug controller interrupts signal group 470 consists of 2 signals. They allow the feedback of interrupts from the thread debug controller 400 back to the controller 130. These interrupts are handled in the same way as all other external interrupts to the controller 130. The use of these signals is entirely programmable, but typical examples of their use would include the collection of statistics on events requiring attention in the application, and the activation of a debug monitor thread in a particular processing resource 150.

The TSIF system interface 412 allows communication between the interface manager sub module 280 of the controller 130 and the thread debug controller 400. This interface comprises both an SubBlockCmd slave input interface 490 and a GenericReg master output interface 480. All processing resources 150 situated within the multicore processor and the TSIF subblock may access the thread debug controller 400 through the SubBlockCmd slave input interface 490 for normal and debug operations, for example, to program the debug parameters during run application time. Equally, the thread debug controller 400 may be granted full access to all internal subblocks of the controller 130 via the GenericReg master output interface 480.

Figure 13:
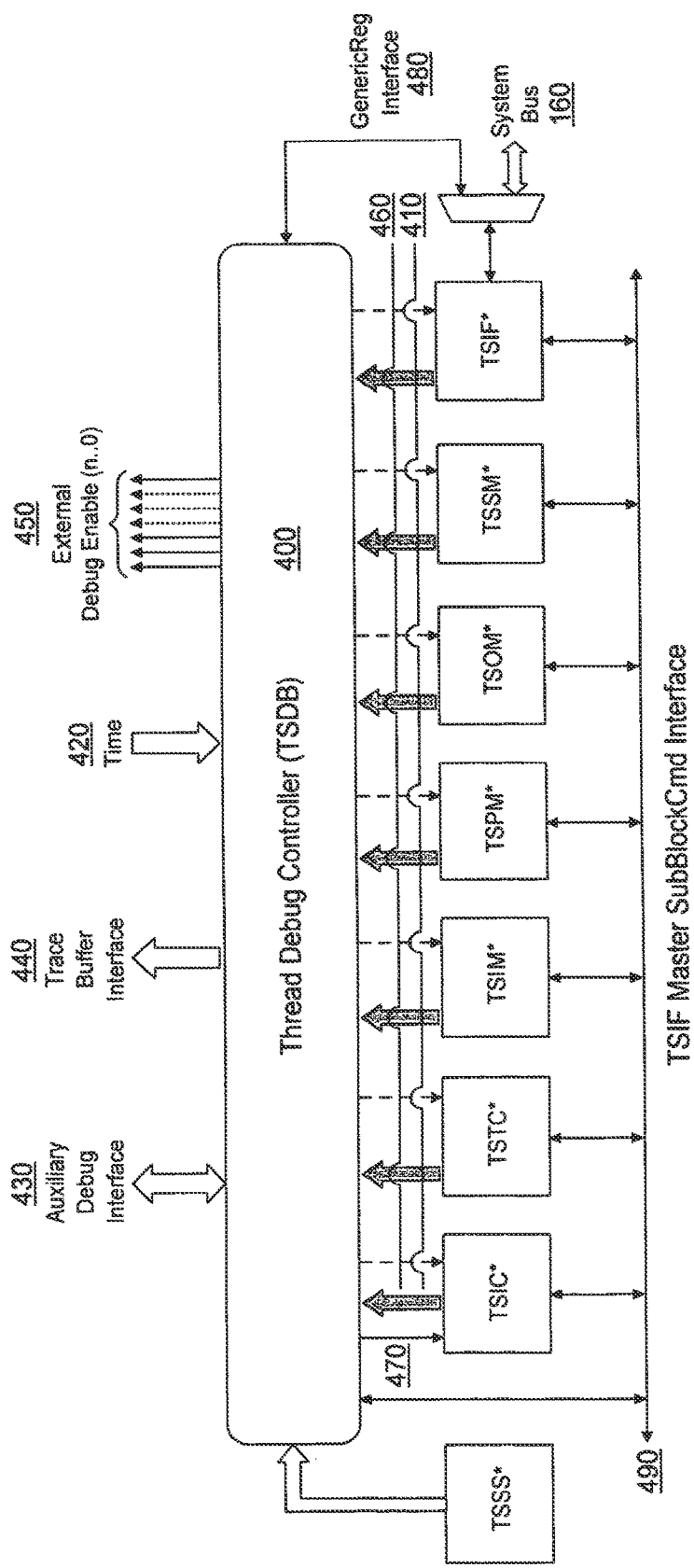
FIG. 13 shows another detailed view of external connections to the thread debug controller of FIG. 10, including connections to the subblocks of the controller of FIG. 2.

FIG. 13 shows a more detailed diagram of the connections between each of the subblocks of the controller 130, and the thread debug controller 400. The thread debug controller 400 accesses resources within each subblock of the controller 130 via the Interface Manager (280), using the generic register, GenericReg, interface 480. This interface also allows the thread debug controller 400 to enable debug and perform single step on each subblock independently.

The thread debug controller 400 also provides a number of system wide closed loop debug capabilities. Firstly, the Interrupt manager (TSIC) 250 has additional thread debug controller 400 feedback interrupts 470. These interrupts are used by the thread debug controller 400 to indicate that a particular set of user definable events that are being watched for have occurred. This interrupt can then be used to make the interrupt manager (TSIC) 250 generate SyncEvents to liberate system management threads which are awaiting that particular SyncEvent. In this way, the debug system can trigger system management threads on detection of particular system events.

Secondly, dedicated TSIF system interface 280 commands can generate TSIF DebugEvents capable of holding 32 bits of data. These can then be utilized as a low bit rate communication channel between a host debugger and each of the processing resources 150.

Figure 14:
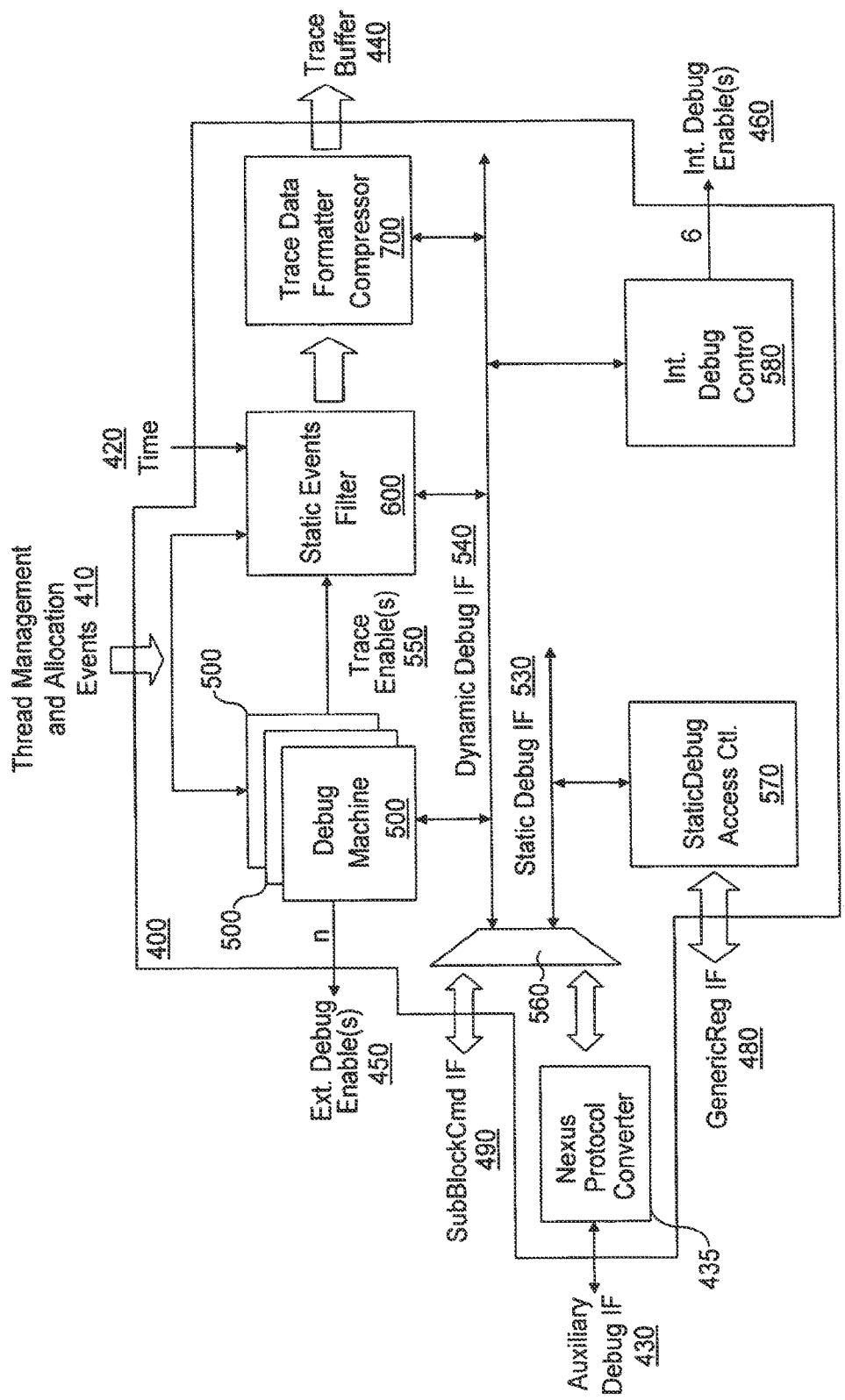
FIG. 14 shows a functional block diagram of the internal composition of the thread debug manager of FIG. 11.

FIG. 14 shows the internal functional implementation of the thread debug controller 400.

The dynamic debug interface 540 is used to control the specifics of the dynamic operation of the thread debug controller 400, for example, what system management and allocation events are to be looked for by the thread debug controller 400, and what actions are to be carried out by the thread debug controller 400 when a particular event is observed.

The static debug interface 530 is used to control the specifics of the static operation of the thread debug controller 400, for example the static event filters.

The SubBlockCmd interface 490 allows the interface manager 280 of the controller 130 to access the dynamic debug interface 540. A specially designed multiplexer 560 only allows access to the dynamic debug interface 540 from the SubBlockCmd interface 490. The Nexus protocol converter 435 converts signals from an external debug host using the IEEE Nexus 5001 protocol standard into internal signals suitable for controlling the debug operation of the thread debug controller 400. In so doing, the converter 435 also provides a subset of the Nexus recommended registers. The external debug host is allowed to access both the dynamic debug interface 540, and the static debug interface 530, via the multiplexer 560. The external debug host is also allowed to access all the internal subblocks 200-280, of the controller 130 via the interface manager 280 generic interface.

Figure 15:
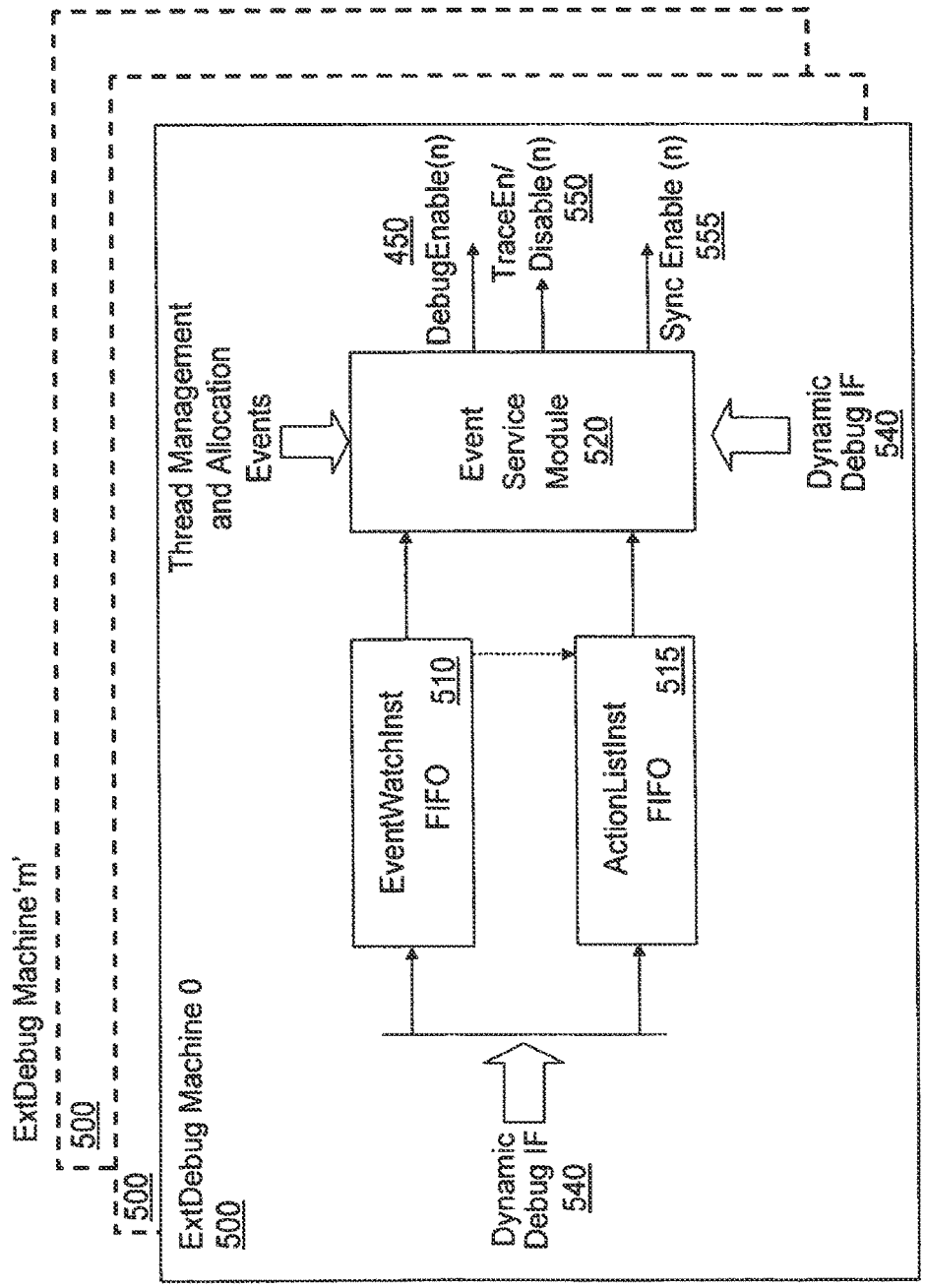
FIG. 15 shows a logical block diagram of one of the debug machines of FIG. 14.

FIG. 15 shows the logical diagram of one of the debug machines 500. The number of debug machines 500 is arbitrary, and is set at design time.

Debug Machines 500 provide a flexible and user configurable method of setting up multiple break or watch points, and complex trigger scenarios for any individual, pool or arbitrary group of the processing resources 150. The debug machine(s) 500 can also enable/disable internal trace recording modules and static event filters 600 as a result of observing the occurrence of a trigger scenario.

Each debug machine 500 comprises an EventWatchInst First In First Out (FIFO) register 510, for storing events to be watched for by that debug machine 500, and an ActionListInst FIFO register 515, for storing the action to be carried out upon detection of a particular event from the EventWatchInst FIFO 510. These registers are programmed with their respective instructions through the dynamic debug interface 540. Each debug machine 500 also comprises an event service module 520, which takes the outputs from both the EventWatchInst and ActionListInst registers, and compares them with the system management and allocation events inputted from the individual subblocks of the controller 130. The event service module then outputs one or more of the following: a DebugEnable signal 450, for use in enabling the local debug and trace unit 151 of the corresponding processing resource 150; a TraceEnable/Disable 550 to enable (or disable) the static event filter 600 outputting the trace information to the trace buffer 440; a SyncEnable signal 555, for controlling the other debug machines concatenated together with the current debug machine 500. The debug machines 500 also have an input from the dynamic debug interface 540, for debug programming purposes.

Figure 16:
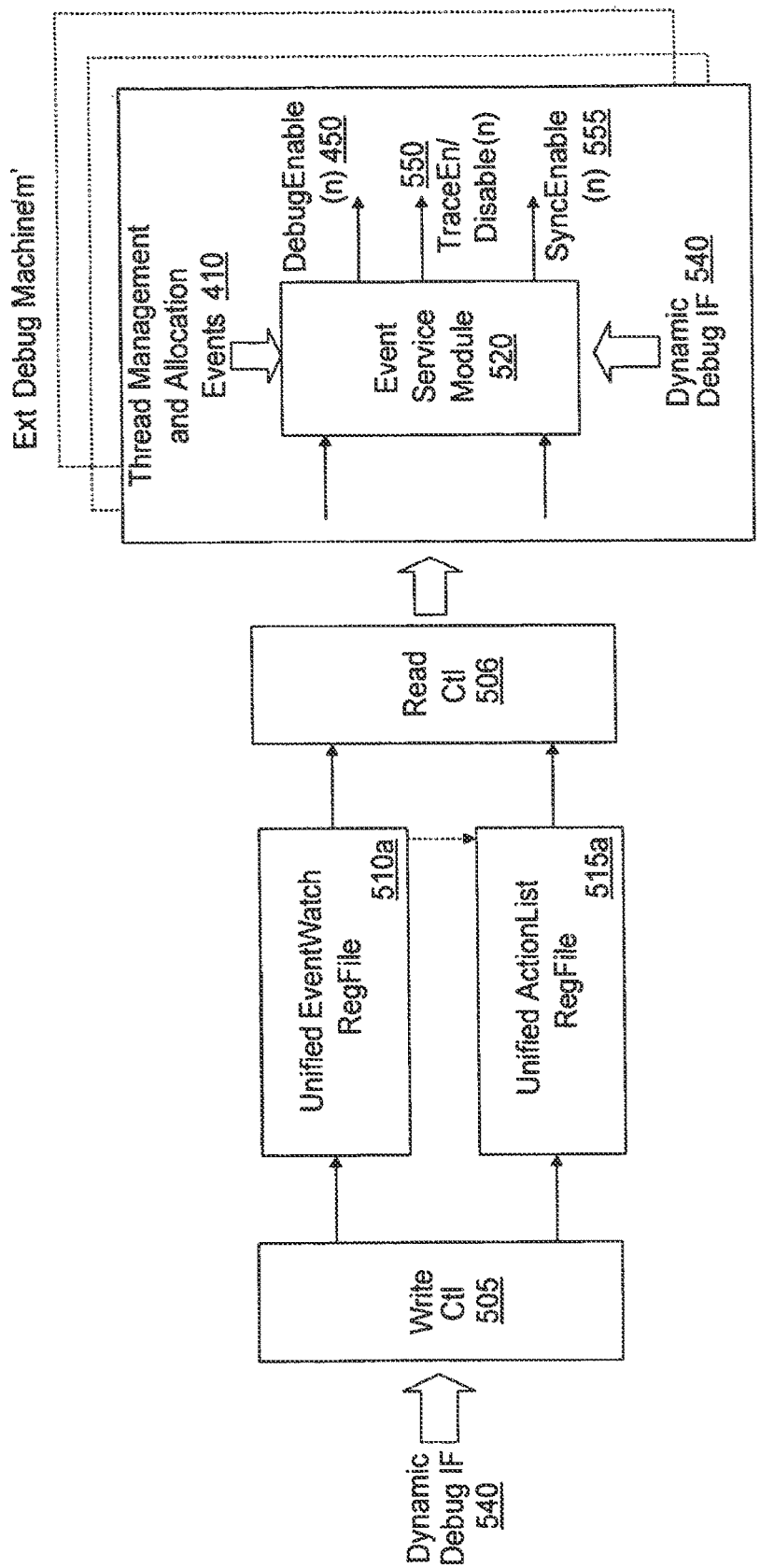
FIG. 16 shows a physical block diagram of one of the debug machines of FIG. 14.

FIG. 16 shows the physical implementation of the debug machines 500 in the specific embodiment of the invention described herein. In this embodiment, the EventWatchInst FIFO 510*a* and ActionListInst FIFO 515*a* are actually implemented as two instruction register files shared between all debug machines 500. These unified register files 510*a* and 515*a* are accessed as logically independent FIFOs, via read 506 and write 505 control logic systems. This implementation allows the FIFO depth for each debug machine 500 to be individually configured to suit a particular implementation by the user.

Figure 17:
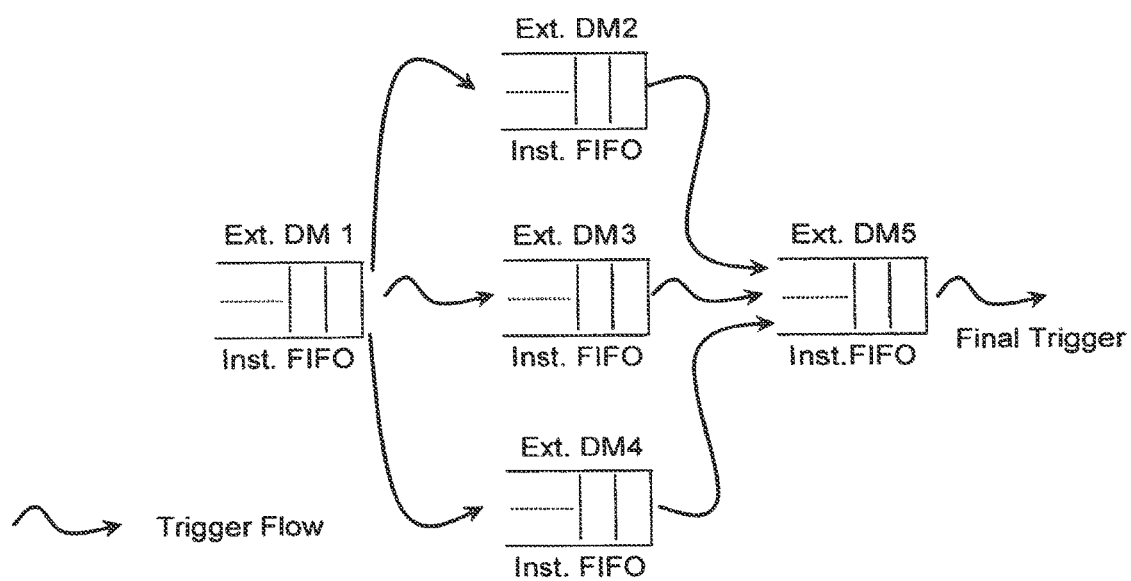
FIG. 17 shows an example of the concatenation ability of the debug machines of FIG. 14.

FIG. 17 shows the concatenation ability of the debug machines 500. This provides the ability to program multiple complex logical trigger combinations. The SyncEnable signals 555 of the debug machines 500 are used to create these complex trigger combinations. In the trigger scenario shown, a single sequence of individual trigger events must be followed by a combination of three trigger sequences, which in turn must be followed by another single trigger sequence before an action is carried out. Due to the provision of multiple debug machines 500, combinatorial trigger relationships may be evaluated simultaneously.

EventWatch instructions are used to catch single events from a particular subblock 200 to 280 within the controller 130. The Finite State Machine (FSM) that controls each debug machine 500 will look for the subblock events specified in the EventWatch instruction, and perform the action (e.g. breakpoint enable, etc.) defined within the associated ActionList Instruction.

Each EventWatch instruction is 44 bits wide. There are two main types of EventWatch instruction, single and double word EventWatch instructions. Double word EventWatch instructions are 88 bits long, and occupy two entries within the EventWatchInst FIFO 510. The two types are shown below:

| Single Word EventWatch Instruction Format | | | | |
|---|---|---|---|---|
| | | Bit | | |
| Word | 43 ... 41 | 40 ... 36 | 35 ... 32 | 31 ... 0 |
| 0 | EWOpcode | SubModuleID | EventID | EventData |

| Double Word EventWatch Instruction Format | | | | |
|---|---|---|---|---|
| | | Bit | | |
| Word | 43 ... 41 | 40 ... 36 | 35 ... 32 | 31 ... 0 |
| 1 | MaskOp | SubModuleIDMask | EventIDMask | EventDataMask |
| 0 | EWOpcode | SubModuleID | EventID | EventData |

The individual fields of both types of EventWatch instructions are:

1. EWOpcode ( ): This is a 3 bit code that defines the operation format. This can be any of:

| EWOpcode | Numonics | Description |
|---|---|---|
| 000 | | Reserved. |
| 001 | SWIE | Single Word Instruction & Execute. When the specified event is detected the first instruction in the ActionList Instruction FIFO 515 is executed and the Debug Machine 500 is halted until reset by the user. |
| 010 | SWINE | Single Word Instruction & No Execute. When the specified event is detected, the Debug Machine 500 continues to execute the next instruction from the EventWatch Instruction FIFO 510. This instruction may be used to provide nested break/watch points. No ActionList Instruction 515 is executed. |
| 011 | DWIE | Double Word Instruction & Execute. Same as in SWIE, however, "MaskOp", with the corresponding mask field, is applied to each operand field prior to a check for zero. Requires two entries within Event Watch instruction FIFO 510. |
| 100 | DWINE | Double Word Instruction & No Execute. Same as in SWINE, however, "MaskOp", with the corresponding mask field, is applied to each operand field prior to a check for zero. Requires two entries within Event Watch instruction FIFO 510. |
| 101-111 | Reserved. | |

2. SubModuleID( ): This 5 bit code defines the subblock to which the event relates:

| SubModuleID Field | Module Description |
|---|---|
| 00000 | Reserved. |
| 00001 | TSIF |
| 00010 | TSIM |
| 00011 | TSOM |
| 00100 | TSSM |
| 00101 | TSPM |
| 00110 | TSMM |
| 00111 | TSTC |
| 0100 | TSIC |
| 0101 | TSSS |
| 01010-01111 | Reserved for further sub modules. |
| 10000 | Debug Machine 0. |
| 10001 | Debug Machine 1. |
| ... | ... |
| 11111 | Debug Machine 15. |

3. EventID( ): This 4 bit code defines the individual subblock event, as described by the EventID provided within each Event provided across interface 410 from each of the subblocks 200 to 280 that make up the controller 130.

4. EventData( ): This 32 bit code defines the individual subblock 200 to 280 event being watched for, for example the pReference field within the controller dedicated controller memory 190.

Figure 18:
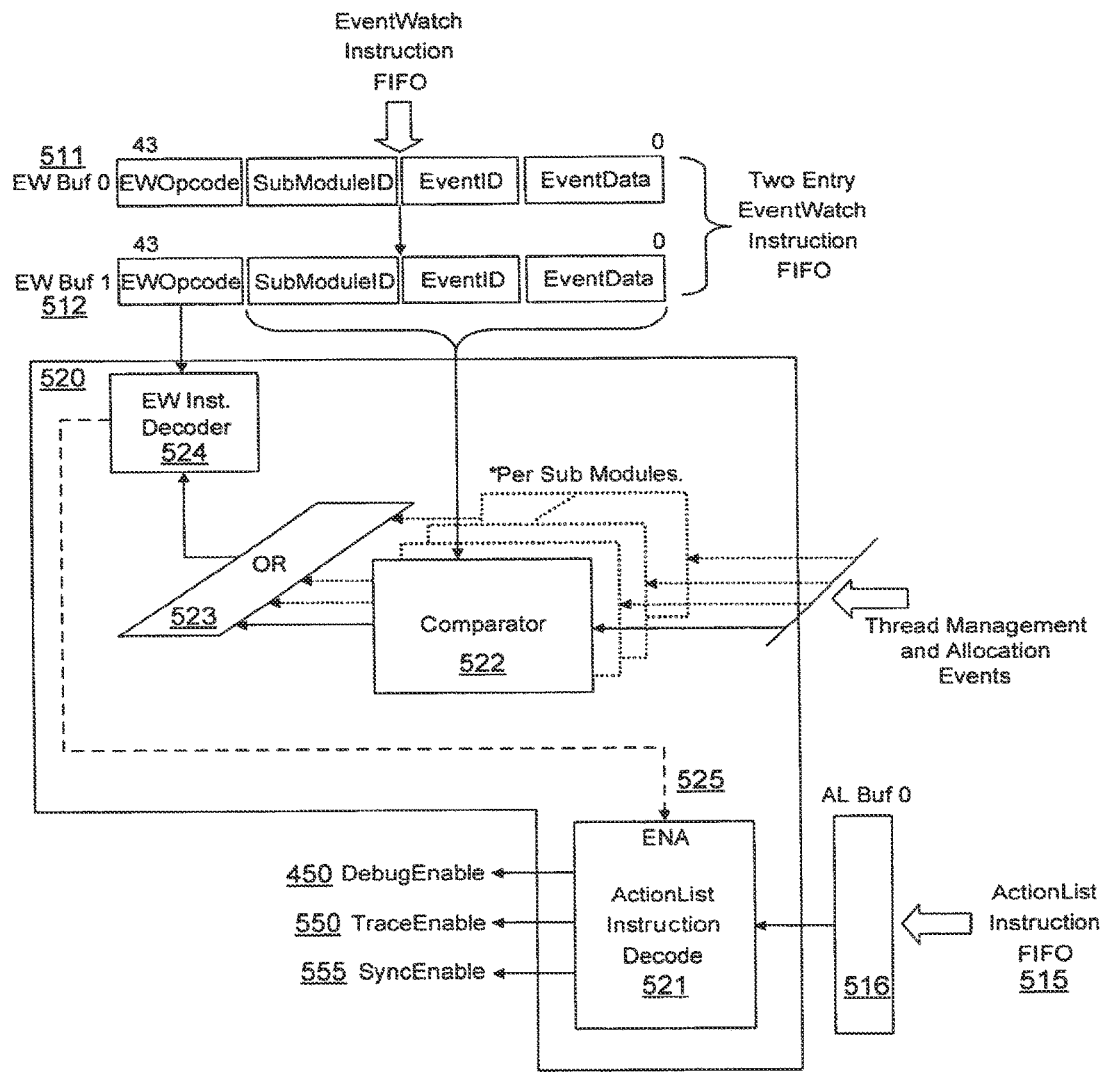
FIG. 18 shows the instruction dataflow within a debug machine in the case of a single word EventWatch.

FIG. 18 shows the dataflow within the debug machine 500 for a single word event watch.

For a single word event watch, the next EventWatch Instruction is first loaded from the EventWatchInst FIFO 510, into the first of two EventWatch instruction buffers within the event service module 520. Next, the SubModuleID, EventID and EventData parts are compared to the incoming controller 130 events using a comparator 522. Although these only contain the EventID and EventData, the SubModuleID is known because each subblock has its own particular interface 410. The result of the comparison is then ORed with the results of the other comparisons being carried out by the other debug machines 500, if applicable, using the OR logic block 523. The output of the OR function block is used to control the output of an EventWatch instruction decoder 524, which decodes the EWOpcode contained within the EventWatch instruction. The output of the Event-Watch instruction decoder 524 itself controls the output of the ActionList instruction decoder 521, which decodes the ActionList instruction associated with the EventWatch instruction, which has previously been loaded in from the ActionList instruction FIFO 515, via an ActionList buffer 516. The output of the ActionList instruction decoder 521 can be any one of: a DebugEnable signal for controlling the local debug and trace unit 151 of the processing resource 150 associated with the debug machine 500 in question; a TraceEnable signal for enabling the output of the trace data from this point onwards; a SyncEnable signal for enabling synchronisation between debug machines 500.

In addition to the fields present within a single word EventWatch instruction, the double word EventWatch instruction contains a set of masks, which are applied to the SubmoduleID, EventID and EventData inputs, according to the instruction specified in the MaskOp field, prior to being evaluated against the EventWatch instruction field. The MaskOp field can have any of the values:

| MaskOp Field | Module Description |
|---|---|
| 0000 | Bitwise AND. |
| 0001 | Bitwise OR. |
| 0010 | Bitwise XOR |
| 0011-1111 | Reserved. |

Figure 19:
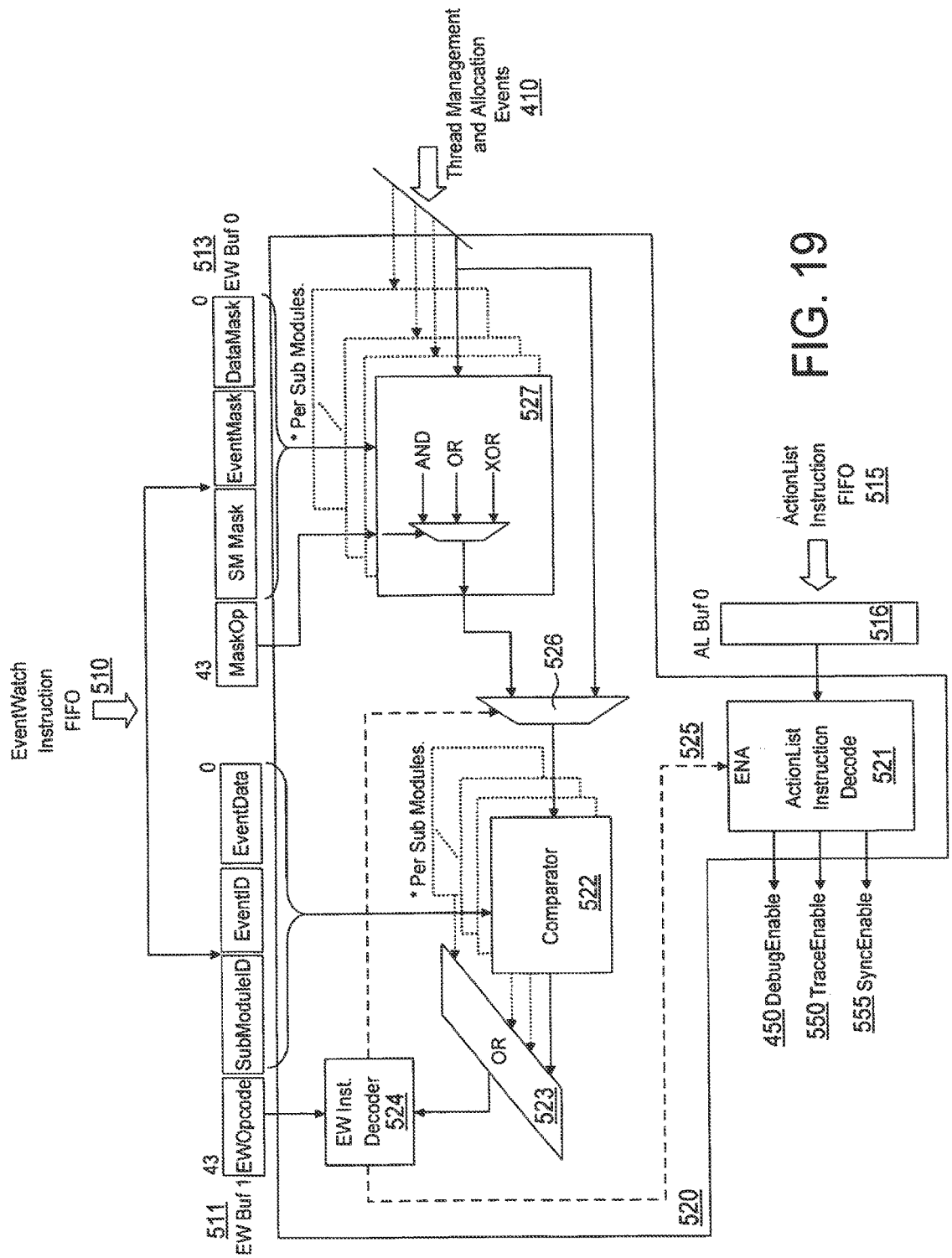
FIG. 19 shows the instruction dataflow within a debug machine in the case of a double word EventWatch.

FIG. 19 shows the dataflow within a debug machine 500, in the case of a double word EventWatch instruction being executed. The principle difference to the execution of a single word EventWatch instruction is that the SubModuleID, EventID and EventData fields of word 1 of the double word EventWatch instruction is ANDed, ORed or XORed with word 0 of the double word EventWatch instruction, dependent on the MaskOp code type as shown above.

Both single and double EventWatch instructions use the same ActionList Instructions. The ActionList instruction enables the debug machine(s) 500 to perform complex break point triggering, trace enabling or disabling, and synchronisation between various debug machines 500, and contain the following Fields:

| FieldName | Bits | Description |
|---|---|---|
| TraceEnable | 1 | Enable or Disable run time trace information.<br>0 - Disable trace module 151 (if enabled).<br>1 - Enable trace module 151 (if disabled). |
| SFTIndex | 2 | Identify which "Static Filter Table Index" (within the Static Event Filter module 600), is used when the TraceEnable is asserted. |
| BrakeEna | N + 1 | Breakpoint enable to system processing resources 150 & Debug Machine(s) 500, supporting up to "N" system processing resources 150. Thus any arbitrary combination of system processing resources 150 may have their breakpoints enabled.<br>Bit[0] - Internal Debug Machine 500.<br>Bit[1] - External system processing resource 1 debug enable. |
| | | Bit[N] - External system processing resource N debug enable. |
| SWSync | M | Issue Synchronisation event to other Debug Machine(s) 500 to allow complex chaining of Debug Machine(s) 500. Supporting up to "M" Debug Machines 500. |
| IntEnable | 2 | Providing 2 interrupt pins to TSIC 250 to support software features, for example, run time gathering of statistics. |

Figure 20:
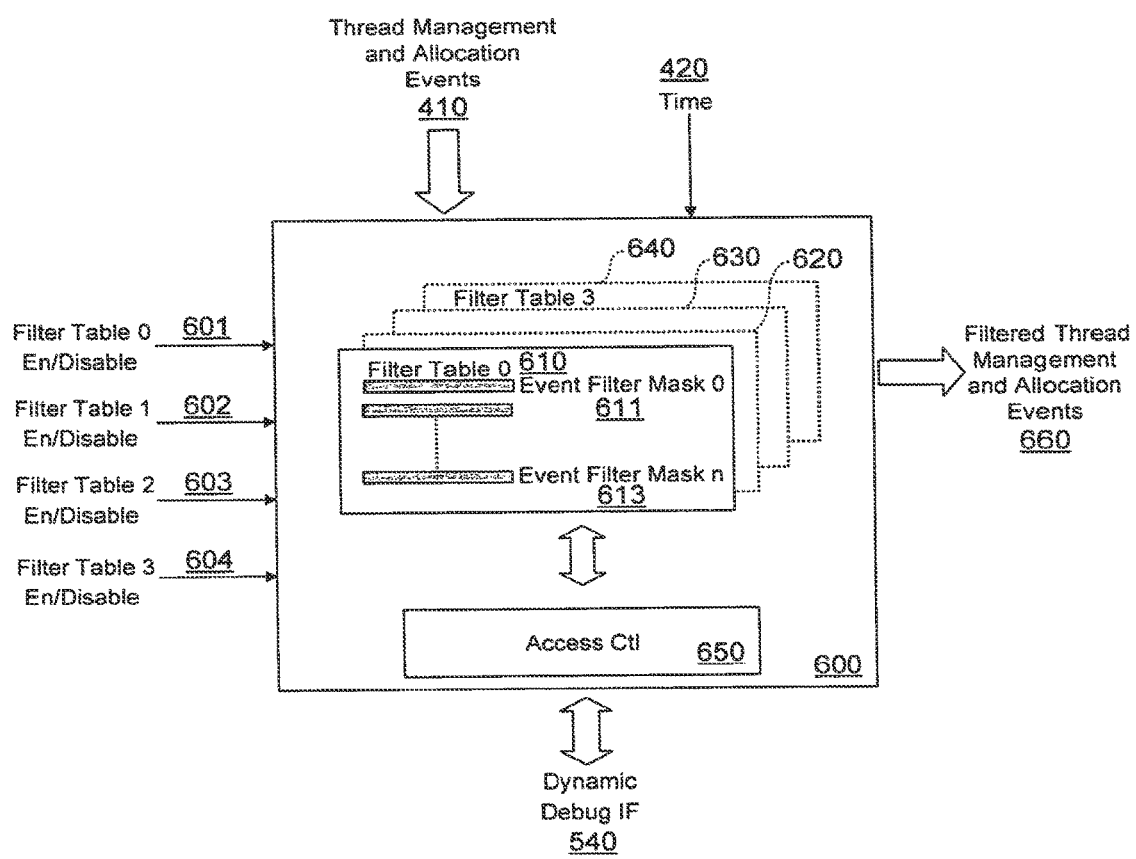
FIG. 20 shows a functional block diagram of an exemplary Static events filter module of FIG. 14.

FIG. 20 shows the functional block diagram of the static event filter 600, which performs filtering of system management and allocation events before passing them out onto the trace data formatter compressor module 700 for capture. This filter module 600 also performs time stamping of all events received from the controller 130, using the 32 bit input from the time interface 420.

The static event module provides a set of user programmable, via the static interface 530, event filter masks 611 to 613 which are used to select whether a particular event from a particular subblock 200 to 280 should be captured. The event filter masks are applied to the SubModuleID, EventID and EventData fields. There are two bits allocated in every event filter mask for every single bit of the data. This results in a filter mask of 76 bits assigned for each event filter mask. The operative meaning of each of these two bits is as follows:

| EventFilterMaskBits | Data Bit Field | Filter Status |
|---|---|---|
| 00 | 0 | PASS. |
|  | 1 | FAIL. |
| 01 | 0 | FAIL. |
|  | 1 | PASS. |
| 10 | 0 | PASS. |
|  | 1 | PASS. |
| 11 | 0 | FAIL. |
|  | 1 | FAIL. |

The user definable number of Event filter masks 611 to 613 can be allocated to one of four event filter mask tables 610. Each event filter table 610 can contain a user definable number of event filter masks 611 to 613. However, in this specific embodiment, these tables must contain contiguous filter masks. These tables allow further programmability and efficient use of hardware resources through the provision of filter mask subsets, which can be enabled for individual debug machine 500 to use.

Figure 21:
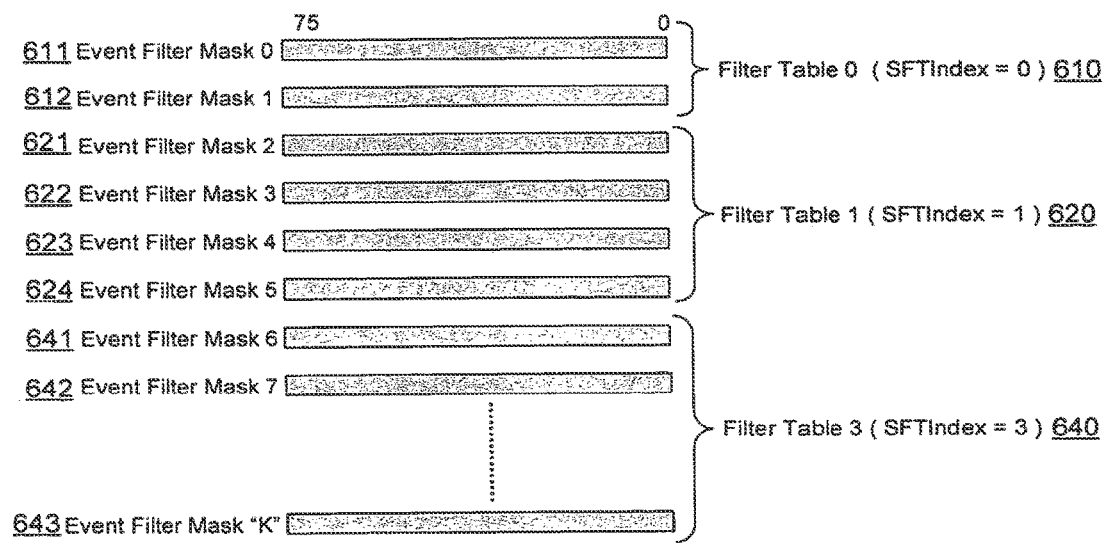
FIG. 21 shows an exemplary allocation of Even Filter masks within a Static Event Filter module of FIG. 20.

FIG. 21 shows the allocation of particular event filter masks 611 to 613, to particular event filter mask tables 610. Note that in this example, the filter table number 3 is not used.

Figure 22:
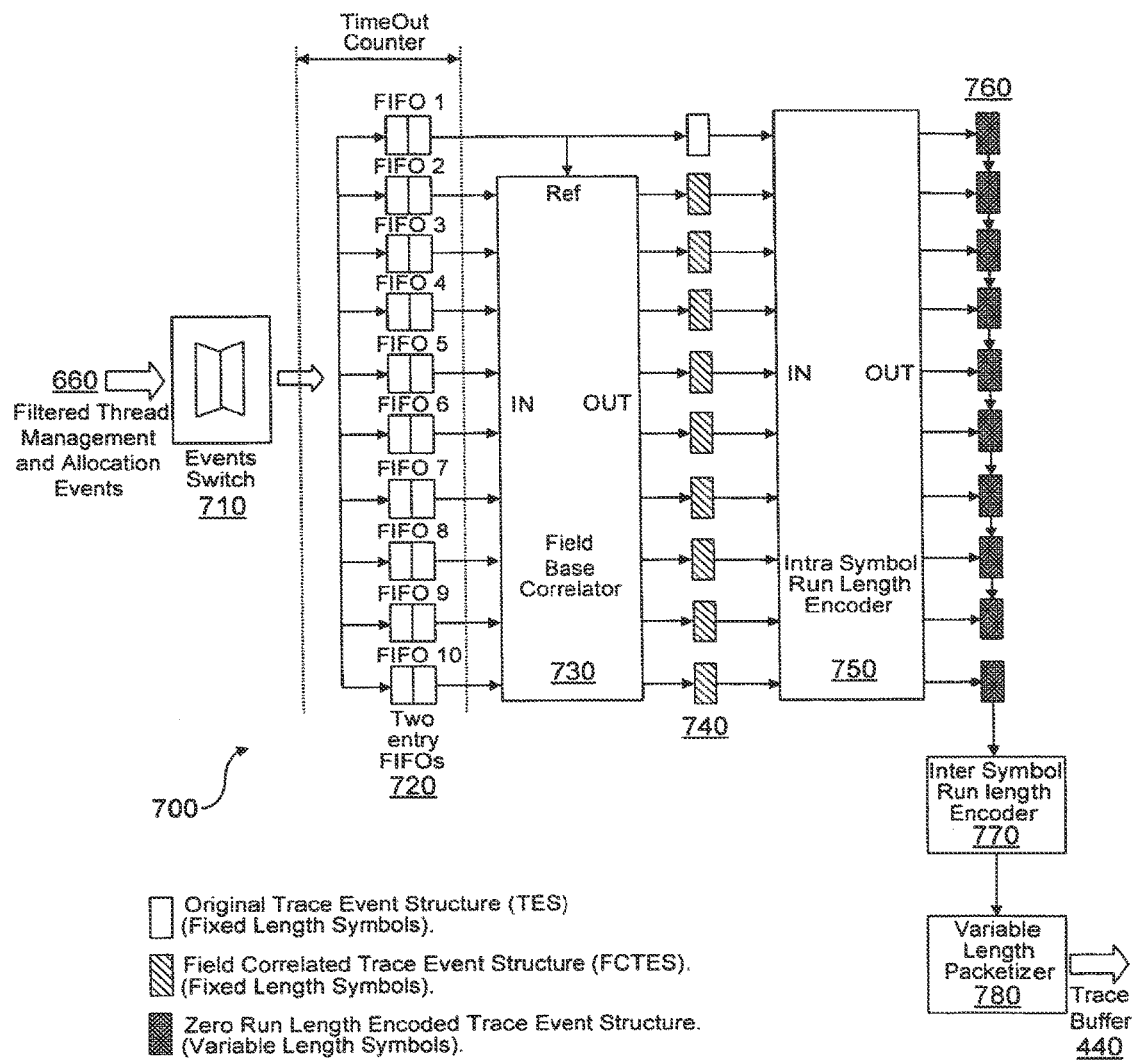
FIG. 22 shows a block diagram of an example of the Trace Data Formatter/Compressor module of FIG. 14.

FIG. 22 shows a functional block diagram of the trace data formatter compressor 700 of the specific embodiment of the invention described herein.

The trace data formatter compressor module 700 compresses the trace data to ensure that the best possible use is made of the limited capacity on-chip trace buffer modules. Although compression modules may be provided together with the trace aggregation device 142 or unified trace buffer 143, these are designed to aggregate and compress instruction level, or equivalent, debug and trace data from each of the local debug and trace units 151 associated with each of the processing resources 150. Since compression is optimised when the nature of the data is both well known and of similar type. Therefore this compressor 700 acts on the well known type, and similar form data derived from the static event filter 600, before being output from the thread debug controller 400, to the unified aggregation point 142, if present.

The trace data formatter compressor 700 contains an event switch 710 which routes all the filtered and time stamped subblock events into the next available two entry FIFO 720, which form the inputs to the field base correlator 730. The FIFOs are two entry to allow either single or double word events to be stored. The event switch 710 is capable of accepting ten simultaneous events from the ten subblocks 200 to 280 of the controller 130. The event switch always writes to the lowest numbered FIFO 720 currently available.

Once all the FIFOs 720 contain at least one entry, or once an internal timer expires, denoting the end of the current FIFO load cycle, then the FIFOs are pushed into the field base correlator. The internal timer is loaded with a fixed value when at least one entry resides in any of the 10 FIFOs 720 and is reloaded when the events are read out.

The field base correlator 730 performs fixed function operations on each of the fixed length event fields, to maximise the number of zeros in the field on output. This is done by exploiting spatial and temporal correlation within each field, referenced to the first FIFO. The first FIFO is therefore left as it is. The resultant fixed length fields for FIFOs 2 to 10, and the unaltered FIFO 1 are then output to another field correlated FIFO 740, prior to input into an intra symbol run length encoder 750. This intra symbol run length encoder 750 performs zero run length encoding on each input symbol, resulting in a set of variable length output symbols. These are again stored in a set of output FIFOs 760, before being loaded into an Inter symbol run length encoder 770 that produces the final output bitstream. The final output bitstream is packetized into variable length packets which are suitable for the trace buffer interface 440, by a variable length packetizer 780.

The format of the trace packet data is physical layer dependent. Under circumstances where the physical layer does not have an explicit start of packet signal, a receiver FSM may use the fixed pattern header and packet length field to over a number of packets to obtain a lock on to the packet delineations. An example packet format:

| Syntax | Byte Size | Comments |
| --- | --- | --- |
| PacketStart | 1 | Fixed byte pattern to indicate start of new packet 0xFF. |
| ByteCount | 1 | Indicate total number of bytes within the packet following this byte. Value 0 is valid indicate no more bytes (i.e. NULL packet). |
| PacketData | ByteCount | Compressed System management and allocation Events data. |

Referring back to FIG. 14, the internal debug control module 580 of the thread debug controller 500 provides individual subblock debug enable signals and single-step functionality for subblocks 200 to 280 within the controller 130. On receiving the internal DebugEnable signal from any of the debug machines 500, the internal debug control module 580 will put the specified subblock into debug mode. The user can also single step specified subblocks via the dynamic debug interface 540.

Whilst a specific embodiment of the invention has been described, it is to be understood that this is by way of example only and that various modifications may be considered. Moreover, the invention is of general application in any device or application that employs a multicore processor, such as, but not limited to, a mobile telephone or voice over Internet Protocol (VoIP) gateway, for example. Therefore, the specific embodiment is not to be seen as limiting of the scope of protection which is to be determined by the following claims.

The invention claimed is:

1. A method of debugging a multicore processor system-on-a-chip ("SoC") comprising a single chip including a thread management and allocation controller and a plurality of processing cores each associated with a controller client from a plurality of controller clients and one debug and trace unit from a plurality of debug and trace units, the method comprising:
    receiving, by one or more of a plurality of controller clients from the thread management and allocation controller communicatively coupled to each of the controller clients, an interrupt comprising an input to a debug and trace unit corresponding to the controller client, each controller client associated with and communicatively coupled to a different processing core of the multicore processor;
    halting, by the debug and trace unit corresponding to the controller client, processing of the processing core corresponding to the controller client in response to the interrupt;
    in response to receiving the interrupt, accessing, by the controller client, a thread descriptor from a head of a dispatch queue associated with the processing core corresponding to the controller client, the thread descriptor comprising thread control information;
    decoding, by the controller client, the thread control information;
    configuring, by the controller client, the processing core associated with the controller client to execute a thread based on the thread control information;
    executing, by the processing core, the thread, wherein the controller client is configured to perform at least one of: supplying data to the processing core during the execution of the thread, and monitoring resource utilization by the processing core during the execution of the thread; and
    in response to a completion of the execution of the thread, outputting, by the corresponding processing core, a result of the execution of the thread.

2. The method of claim 1 wherein the result of the execution of the thread further comprises of at least one of creation of thread, issuance of a synchronization primitive or a combination of thread creation and synchronization.

3. The method of claim 1, further comprising providing, by the controller client, out of band interfaces to the corresponding debug and trace unit for use as outputs for at least one of a run-time or a debug event.

4. The method of claim 1, further comprising providing, by the controller client, out of band interfaces to the corresponding debug and trace unit using a standard interrupt as an input to the corresponding debug and trace unit.

5. The method of claim 1, further comprising of implementing, by the controller client, a FIFO interface for communicating with at least one of the processing core and one or more system resources.

6. The method of claim 1, wherein supplying data to the processing core comprises configuring the controller client to operate in a streaming mode.

7. The method of claim 6, wherein supplying data in the streaming mode comprises streaming data from a system memory to the processing core.

8. The method of claim 1, further comprising:
   interpreting, by the controller client, configuration commands;
   translating, by the controller client, the interpreted configuration commands into write cycles; and
   issuing, by the controller client, the write cycles to the processing core during the execution of the thread.

9. The method of claim 1, wherein the thread is executed in response to one of: receiving an explicit execute primitive or entering a data transferal state.

10. The method of claim 1, wherein the controller client determines that the execution of the thread is complete in response to receiving at least one of a signal from the processing core or measuring an amount of data outputted by the processing core.

11. A multicore processor system-on-a-chip ("SoC") architecture comprising a single chip including a thread management and allocation controller and a plurality of processing cores each associated with a controller client from a plurality of controller clients and a debug and trace unit from a plurality of debug and trace units, the controller client of each processing core comprising:
   an input for receiving an interrupt from the thread management and allocation controller, wherein the interrupt comprises an input to a debug and trace unit corresponding to the controller client;
   a debug and trace unit corresponding to the controller client for halting processing of the processing core associated with the controller client in response to the interrupt;
   a plurality of sub blocks for interfacing the controller client with an associated shared memory to access a thread descriptor from a head of a dispatch queue associated with the processing core corresponding to the controller client, wherein the shared memory is accessed in response to receiving the interrupt, the thread descriptor comprising thread control information;
   a decoder for decoding the thread control information; and
   a finite state machine for configuring the processing core of the controller client to execute a thread based on the thread control information and output a result of the execution of the thread, wherein the finite state machine performs at least one of: supplying data to the processing core during the execution of the thread and monitoring resource utilization by the processing core during the execution of the thread.

12. The controller client of claim 11 wherein the result of the execution of the thread comprises of at least one of a creation of thread, an issuance of a synchronization primitive, or a combination of thread creation and synchronization.

13. The controller client of claim 11, wherein the interrupt further provides out of band interfaces to the corresponding debug and trace unit for use as outputs for at least one of a run-time or a debug event.

14. The controller client of claim 11, wherein the interrupt further provides out of band interfaces to the corresponding debug and trace unit using a standard interrupt as an input to the corresponding debug and trace unit.

15. The controller client of claim 11, further comprising a FIFO interface for communicating with at least one of the processing core and one or more system resources.

16. The controller client of claim 11, wherein supplying data to the processing core comprises configuring the controller client to operate in a streaming mode.

17. The controller client of claim 16, wherein supplying data in the streaming mode comprises streaming data from a system memory to the processing core.

18. The controller client of claim 11, wherein the finite statement machine further:
   interprets configuration commands;
   translates the interpreted configuration commands into write cycles; and
   issues the write cycles to the corresponding processing core during the execution of the thread.

19. The controller client of claim 11, wherein the thread is executed by the processing core in response to one of: receiving an explicit execute primitive or entering a data transferal state.

20. The controller client of claim 11, wherein the finite state machine further determines that the execution of the thread is complete in response to receiving at least one of a signal from the processing core or measuring an amount of data outputted by the processing core.

* * * * *

UNITED STATES PATENT AND TRADEMARK OFFICE
CERTIFICATE OF CORRECTION

| | |
|---|---|
| PATENT NO. | : 9,830,241 B2 |
| APPLICATION NO. | : 14/822667 |
| DATED | : November 28, 2017 |
| INVENTOR(S) | : Mark David Lippett and Ayewin Oung |

Page 1 of 1

It is certified that error appears in the above-identified patent and that said Letters Patent is hereby corrected as shown below:

In the Claims

Column 22, Claim 2, Lines 50-51: replace "comprises of at least one of creation of thread" with -- comprises at least one of creation of a thread --.

Column 22, Claim 5, Lines 61-62: replace "comprising of implementing" with -- comprising implementing --.

Column 24, Claim 12, Lines 8-9: replace "comprises of at least one of a creation of thread" with -- comprises at least one of creation of a thread --.

Signed and Sealed this
Seventeenth Day of April, 2018

Andrei Iancu
*Director of the United States Patent and Trademark Office*